US011115713B2

(12) United States Patent
Loheide et al.

(10) Patent No.: US 11,115,713 B2
(45) Date of Patent: Sep. 7, 2021

(54) MANAGEMENT AND DELIVERY OF OVER-THE-TOP SERVICES OVER DIFFERENT CONTENT-STREAMING SYSTEMS

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory Mcclain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, Mcdonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 15/986,451

(22) Filed: May 22, 2018

(65) Prior Publication Data
US 2018/0343495 A1   Nov. 29, 2018

Related U.S. Application Data

(60) Provisional application No. 62/511,190, filed on May 25, 2017.

(51) Int. Cl.
*H04N 21/458*   (2011.01)
*H04L 29/08*   (2006.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
None
See application file for complete search history.

(56) References Cited

U.S. PATENT DOCUMENTS

| 3,751,581 A | 8/1973 | Sakata et al. |
| 4,500,930 A | 2/1985 | Hamalainen et al. |

(Continued)

OTHER PUBLICATIONS

Final Office Action for U.S. Appl. No. 15/986,218 dated Apr. 24, 2019.

(Continued)

*Primary Examiner* — Jason K Lin
(74) *Attorney, Agent, or Firm* — Chip Law Group

(57) ABSTRACT

An event trigger management system, which handles management and delivery of services on a user device that streams media content from a distribution network, determines one or more media items present in media content of the distribution network. One or more interactive items are overlaid over the one or more media items in the media content and one or more event triggers are received from a client application engine, operational on the user device, based on selection of one or more interactive items. A personalized list is generated based on one or more received event triggers for selection of one or more overlaid interactive items and the generated personalized list is displayed or transmitted to distribution network(s) or application engines associated with the user device.

24 Claims, 15 Drawing Sheets

(51) Int. Cl.

| | | |
|---|---|---|
| *H04N 21/431* | (2011.01) | |
| *H04N 21/81* | (2011.01) | |
| *G06Q 30/02* | (2012.01) | |
| *H04L 29/06* | (2006.01) | |
| *H04N 21/478* | (2011.01) | |
| *H04N 21/233* | (2011.01) | |
| *H04N 21/234* | (2011.01) | |
| *H04N 21/2387* | (2011.01) | |
| *H04N 21/2389* | (2011.01) | |
| *H04N 21/8545* | (2011.01) | |
| *G06Q 30/06* | (2012.01) | |
| *H04N 21/2543* | (2011.01) | |
| *H04N 21/44* | (2011.01) | |
| *H04N 21/845* | (2011.01) | |
| *H04N 21/235* | (2011.01) | |
| *H04N 21/258* | (2011.01) | |
| *H04N 21/435* | (2011.01) | |
| *H04N 21/6332* | (2011.01) | |
| *H04N 21/266* | (2011.01) | |
| *H04N 21/84* | (2011.01) | |
| *H04N 21/239* | (2011.01) | |
| *H04N 21/262* | (2011.01) | |
| *H04N 21/2668* | (2011.01) | |
| *H04N 21/6587* | (2011.01) | |
| *H04L 9/32* | (2006.01) | |
| *H04N 21/24* | (2011.01) | |
| *H04N 21/472* | (2011.01) | |
| *H04N 21/835* | (2011.01) | |
| *H04H 20/10* | (2008.01) | |
| *H04N 21/8358* | (2011.01) | |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(56) References Cited

U.S. PATENT DOCUMENTS

| | | | |
|---|---|---|---|
| 5,294,981 A | 3/1994 | Yazolino et al. | |
| 6,229,524 B1 * | 5/2001 | Chernock | G06F 3/04842 |
| | | | 345/157 |
| 6,378,129 B1 | 4/2002 | Zetts | |
| 6,434,621 B1 | 8/2002 | Pezzillo et al. | |
| 6,625,811 B1 | 9/2003 | Kaneko | |
| 6,701,355 B1 | 3/2004 | Brandt et al. | |
| 6,727,914 B1 | 4/2004 | Gutta | |
| 7,051,352 B1 | 5/2006 | Schaffer | |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gutta | |
| 7,985,134 B2 | 7/2011 | Ellis | |
| 8,005,826 B1 | 8/2011 | Sahami et al. | |
| 8,099,757 B2 | 1/2012 | Riedl et al. | |
| 8,132,203 B2 | 3/2012 | Heer | |
| 8,533,761 B1 | 9/2013 | Sahami et al. | |
| 8,553,853 B2 | 10/2013 | Middleswarth et al. | |
| 8,572,649 B1 | 10/2013 | Gossweiler et al. | |
| 8,578,042 B2 | 11/2013 | Hu et al. | |
| 8,600,382 B2 | 12/2013 | Hicks, III | |
| 8,631,440 B2 | 1/2014 | Gossweiler et al. | |
| 8,826,443 B1 | 9/2014 | Raman et al. | |
| 8,842,879 B2 * | 9/2014 | Laksono | H04N 19/44 |
| | | | 382/103 |
| 8,843,965 B1 | 9/2014 | Kurapati et al. | |
| 8,954,521 B1 | 2/2015 | Faaborg et al. | |
| 9,094,639 B2 | 7/2015 | Yim et al. | |
| 9,130,918 B2 | 9/2015 | Picconi et al. | |
| 9,342,668 B2 | 5/2016 | Wang et al. | |
| 9,380,264 B1 | 6/2016 | Vakalapudi | |
| 9,390,447 B1 | 7/2016 | Smith | |
| 10,075,753 B2 | 9/2018 | Loheide et al. | |
| 2002/0038457 A1 | 3/2002 | Numata et al. | |
| 2002/0178447 A1 | 11/2002 | Plotnick et al. | |
| 2003/0023757 A1 | 1/2003 | Ishioka et al. | |
| 2003/0026628 A1 | 2/2003 | Arimoto | |
| 2003/0051239 A1 | 3/2003 | Hudspeth | |
| 2003/0110507 A1 * | 6/2003 | Dimitrova | H04N 21/4532 |
| | | | 725/110 |
| 2003/0126600 A1 | 7/2003 | Heuvelman | |
| 2003/0151538 A1 | 8/2003 | Escobosa et al. | |
| 2003/0182658 A1 * | 9/2003 | Alexander | G06Q 30/0633 |
| | | | 725/60 |
| 2003/0212708 A1 | 11/2003 | Potrebic et al. | |
| 2003/0236832 A1 * | 12/2003 | McIntyre | H04L 67/325 |
| | | | 709/204 |
| 2004/0022278 A1 | 2/2004 | Thomas et al. | |
| 2004/0031056 A1 | 2/2004 | Wolff | |
| 2004/0128682 A1 | 7/2004 | Liga et al. | |
| 2004/0163103 A1 * | 8/2004 | Swix | H04N 21/6582 |
| | | | 725/13 |
| 2004/0172650 A1 | 9/2004 | Hawkins et al. | |
| 2005/0015816 A1 | 1/2005 | Christofalo et al. | |
| 2005/0060745 A1 | 3/2005 | Riedl et al. | |
| 2005/0096978 A1 | 5/2005 | Black | |
| 2005/0120369 A1 | 6/2005 | Matz | |
| 2005/0132401 A1 * | 6/2005 | Boccon-Gibod | G11B 27/002 |
| | | | 725/34 |
| 2005/0135613 A1 | 6/2005 | Brandenburg et al. | |
| 2006/0031889 A1 | 2/2006 | Bennett et al. | |
| 2006/0064730 A1 | 3/2006 | Rael et al. | |
| 2006/0122916 A1 | 6/2006 | Kassan | |
| 2006/0287915 A1 | 12/2006 | Boulet et al. | |
| 2007/0011718 A1 | 1/2007 | Nee | |
| 2007/0033419 A1 | 2/2007 | Kocher et al. | |
| 2007/0186228 A1 | 8/2007 | Ramaswamy et al. | |
| 2007/0238035 A1 | 10/2007 | Holscher et al. | |
| 2007/0250901 A1 | 10/2007 | McIntire et al. | |
| 2008/0086742 A1 | 4/2008 | Aldrey et al. | |
| 2008/0201735 A1 | 8/2008 | Sumiyoshi et al. | |
| 2008/0271078 A1 | 10/2008 | Gossweiler et al. | |
| 2008/0271080 A1 | 10/2008 | Gossweiler et al. | |
| 2008/0320513 A1 | 12/2008 | Wong et al. | |
| 2009/0070808 A1 | 3/2009 | Jacobs | |
| 2009/0070819 A1 | 3/2009 | Gajda et al. | |
| 2009/0100452 A1 * | 4/2009 | Hudgeons | H04N 7/17318 |
| | | | 725/9 |
| 2009/0254934 A1 | 10/2009 | Grammens | |
| 2009/0256972 A1 | 10/2009 | Ramaswamy et al. | |
| 2009/0285217 A1 | 11/2009 | Frink et al. | |

(56) References Cited

U.S. PATENT DOCUMENTS

| | | | |
|---|---|---|---|
| 2009/0287790 A1 | 11/2009 | Upton et al. | |
| 2010/0010899 A1 | 1/2010 | Lambert et al. | |
| 2010/0125880 A1 | 5/2010 | Roewe | |
| 2010/0146548 A1 | 6/2010 | Yim et al. | |
| 2010/0146559 A1 | 6/2010 | Lee et al. | |
| 2010/0169914 A1 | 7/2010 | Williamson et al. | |
| 2010/0287297 A1 | 11/2010 | Lefebvre | |
| 2010/0325655 A1 | 12/2010 | Perez | |
| 2010/0325657 A1 | 12/2010 | Sellers et al. | |
| 2011/0022471 A1 | 1/2011 | Brueck et al. | |
| 2011/0052144 A1* | 3/2011 | Abbas | G11B 27/034 386/240 |
| 2011/0123062 A1 | 5/2011 | Hilu | |
| 2011/0153464 A1* | 6/2011 | Hendricks | G06Q 30/02 705/27.1 |
| 2011/0161500 A1* | 6/2011 | Yengalasetti | H04N 21/6437 709/227 |
| 2011/0164115 A1 | 7/2011 | Bennett et al. | |
| 2011/0177775 A1 | 7/2011 | Gupta et al. | |
| 2011/0209181 A1 | 8/2011 | Gupta et al. | |
| 2011/0238754 A1 | 9/2011 | Dasilva et al. | |
| 2011/0246202 A1 | 10/2011 | McMillan et al. | |
| 2012/0017282 A1 | 1/2012 | Kang et al. | |
| 2012/0110621 A1 | 5/2012 | Gossweiler | |
| 2012/0143693 A1 | 6/2012 | Chung et al. | |
| 2012/0192232 A1 | 7/2012 | Ellis | |
| 2012/0271942 A1 | 10/2012 | Walker et al. | |
| 2012/0272264 A1 | 10/2012 | Suzuki et al. | |
| 2012/0284737 A1 | 11/2012 | Savoor et al. | |
| 2012/0304223 A1 | 11/2012 | Sargent et al. | |
| 2013/0121487 A1 | 5/2013 | Lorberbaum et al. | |
| 2013/0160051 A1 | 6/2013 | Armstrong et al. | |
| 2013/0198328 A1 | 8/2013 | Green et al. | |
| 2013/0205212 A1 | 8/2013 | Sinha et al. | |
| 2013/0208811 A1 | 8/2013 | Liu et al. | |
| 2013/0227283 A1 | 8/2013 | Williamson et al. | |
| 2013/0227284 A1 | 8/2013 | Pfeffer et al. | |
| 2013/0263168 A1 | 10/2013 | Choi | |
| 2013/0263182 A1 | 10/2013 | Ivy et al. | |
| 2013/0276023 A1 | 10/2013 | Kent et al. | |
| 2013/0305287 A1 | 11/2013 | Wong et al. | |
| 2013/0312041 A1* | 11/2013 | Gresta | H04N 21/2365 725/61 |
| 2013/0325605 A1 | 12/2013 | Callaghan et al. | |
| 2014/0013354 A1 | 1/2014 | Johnson et al. | |
| 2014/0020017 A1 | 1/2014 | Stern et al. | |
| 2014/0032259 A1 | 1/2014 | LaFever et al. | |
| 2014/0033240 A1* | 1/2014 | Card, II | G06Q 30/0242 725/14 |
| 2014/0071818 A1* | 3/2014 | Wang | H04W 4/029 370/230 |
| 2014/0143806 A1 | 5/2014 | Steinberg et al. | |
| 2014/0150019 A1 | 5/2014 | Ma et al. | |
| 2014/0152894 A1 | 6/2014 | Childs et al. | |
| 2014/0157312 A1 | 6/2014 | Williams et al. | |
| 2014/0173666 A1 | 6/2014 | Gordon et al. | |
| 2014/0189514 A1 | 7/2014 | Hilliard | |
| 2014/0189743 A1 | 7/2014 | Kennedy et al. | |
| 2014/0189754 A1 | 7/2014 | Major et al. | |
| 2014/0237243 A1 | 8/2014 | Ma et al. | |
| 2014/0282723 A1 | 9/2014 | Sinha et al. | |
| 2014/0310745 A1 | 10/2014 | Canney et al. | |
| 2014/0317666 A1 | 10/2014 | Chiarulli et al. | |
| 2014/0351843 A1 | 11/2014 | Theriault | |
| 2014/0359656 A1 | 12/2014 | Banica et al. | |
| 2014/0366068 A1 | 12/2014 | Burkitt et al. | |
| 2015/0012926 A1 | 1/2015 | Wei et al. | |
| 2015/0033255 A1 | 1/2015 | Neumann et al. | |
| 2015/0058874 A1 | 2/2015 | Sun et al. | |
| 2015/0074732 A1 | 3/2015 | Green et al. | |
| 2015/0106856 A1* | 4/2015 | Rankine | H04N 21/8583 725/60 |
| 2015/0127845 A1 | 5/2015 | Phillips et al. | |
| 2015/0237386 A1 | 8/2015 | Sheehan et al. | |
| 2015/0237389 A1 | 8/2015 | Grouf et al. | |
| 2015/0249865 A1 | 9/2015 | Oliveira | |
| 2015/0271234 A1 | 9/2015 | O'Malley et al. | |
| 2015/0289022 A1 | 10/2015 | Gross | |
| 2015/0382042 A1 | 12/2015 | Wagenaar et al. | |
| 2015/0382047 A1 | 12/2015 | Os et al. | |
| 2015/0382274 A1 | 12/2015 | Logvinov et al. | |
| 2016/0029055 A1 | 1/2016 | Nunez et al. | |
| 2016/0063530 A1* | 3/2016 | Lin | G06Q 30/02 705/14.14 |
| 2016/0073155 A1 | 3/2016 | Subramaniam et al. | |
| 2016/0112740 A1 | 4/2016 | Francisco et al. | |
| 2016/0127786 A1 | 5/2016 | Langer | |
| 2016/0127788 A1 | 5/2016 | Roberts et al. | |
| 2016/0150290 A1 | 5/2016 | Chandler et al. | |
| 2016/0182954 A1 | 6/2016 | Nguyen et al. | |
| 2016/0198202 A1 | 7/2016 | Brandenburg et al. | |
| 2016/0227260 A1 | 8/2016 | Hundemer et al. | |
| 2016/0255391 A1 | 9/2016 | Noble | |
| 2016/0308958 A1 | 10/2016 | Navali et al. | |
| 2016/0316247 A1 | 10/2016 | Biagini et al. | |
| 2017/0064400 A1 | 3/2017 | Riegel et al. | |
| 2017/0070789 A1 | 3/2017 | Liassides et al. | |
| 2017/0085935 A1 | 3/2017 | Riedel et al. | |
| 2017/0099506 A1 | 4/2017 | Grover | |
| 2017/0099525 A1 | 4/2017 | Ray et al. | |
| 2017/0171610 A1 | 6/2017 | Nair et al. | |
| 2017/0193544 A1 | 7/2017 | Glasgow et al. | |
| 2017/0195718 A1 | 7/2017 | Nair et al. | |
| 2017/0201779 A1 | 7/2017 | Publicover et al. | |
| 2017/0238035 A1 | 8/2017 | Perez | |
| 2017/0289597 A1 | 10/2017 | Riedel et al. | |
| 2018/0007060 A1 | 1/2018 | Leblang et al. | |
| 2018/0048599 A1 | 2/2018 | Arghandiwal et al. | |
| 2018/0131986 A1 | 5/2018 | Cole et al. | |
| 2018/0165650 A1 | 6/2018 | Kashyape et al. | |
| 2018/0184047 A1 | 6/2018 | Simonsen et al. | |
| 2018/0300751 A1 | 10/2018 | Hammitt et al. | |
| 2018/0343505 A1 | 11/2018 | Loheide et al. | |
| 2020/0244778 A1 | 7/2020 | Berookhim et al. | |

OTHER PUBLICATIONS

Final Office Action for U.S. Appl. No. 15/988,308 dated May 9, 2019.
Final Office Action in U.S. Appl. No. 15/396,475 dated Feb. 25, 2019.
Non-Final Office Action in U.S. Appl. No. 15/396,614 dated Mar. 7, 2019.
Non-Final Office Action in U.S. Appl. No. 15/396,468 dated Mar. 1, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,475 dated Nov. 30, 2018.
Non-Final Office Action in U.S. Appl. No. 15/396,614 dated May 18, 2018.

(56) References Cited

OTHER PUBLICATIONS

Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,614 dated Oct. 24, 2019.
Corrected Notice of Allowance for U.S. Appl. No. 15/396,624 dated Sep. 5, 2019.
Final Office Action for U.S. Appl. No. 15/396,468 dated Nov. 6, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 16/229,310 dated Nov. 29, 2019.
Advisory Action for U.S. Appl. No. 15/396,475 dated Jun. 3, 2019.
Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance in U.S. Appl. No. 15/396,453 dated Jun. 13, 2019.
Final Office Action for U.S. Appl. No. 15/396,614 dated Aug. 12, 2019.
Non-Final Office Action for U.S. Appl. No. 15/986,361 dated Jul. 11, 2019.
Non-final Office Action for U.S. Appl. No. 15/988,241 dated Jun. 27, 2019.
Non-Final Office Action for U.S. Appl. No. 15/396,475 dated Aug. 8, 2019.
Non-Final Office Action for U.S. Appl. No. 16/128,104 dated Aug. 21, 2019.
Notice of Allowance for U.S. Appl. No. 15/396,624 dated May 31, 2019.
Supplemental Notice of Allowance for U.S. Appl. No. 15/396,624 dated Aug. 14, 2019.
Advisory Action for U.S. Appl. No. 15/396,468 dated Jan. 16, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Restriction Requirement for U.S. Appl. No. 16/231,467 dated Feb. 5, 2020.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/988,472 dated Dec. 27, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Advisory Action for U.S. Appl. No. 15/396,475 dated May 13, 2020.
Advisory Action for U.S. Appl. No. 15/986,361 dated Feb. 26, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Final Office Action for U.S. Appl. No. 15/988,308 dated May 6, 2020.
Final Office Action for U.S. Appl. No. 16/230,268 dated Apr. 17, 2020.
Non-Final Office Action for U.S. Appl. No. 15/988,492 dated Feb. 18, 2020.
Non-Final Office Action for U.S. Appl. No. 16/229,614 dated Mar. 19, 2020.
Non-Final Office Action for U.S. Appl. No. 16/235,445 dated Apr. 2, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/128,104 dated May 20, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 15/988,572 dated Jul. 2, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/229,614 dated Jul. 9, 2020.
Final Office Action for U.S. Appl. No. 16/234,870 dated Jul. 9, 2020.
Non-Final Office Action for U.S. Appl. No. 15/396,475 dated Aug. 6, 2020.
Non-Final Office Action for U.S. Appl. No. 16/236,713 dated May 29, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 16/234,870 dated Aug. 19, 2020.

(56) References Cited

OTHER PUBLICATIONS

Corrected Notice of Allowance for U.S. Appl. No. 15/988,241 dated Nov. 18, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Final Office Action for U.S. Appl. No. 16/235,445 dated Sep. 3, 2200.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,308 dated Sep. 8, 2020.
Non-Final Office Action for U.S. Appl. No. 15/988,492 dated Sep. 10, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 16/230,268 dated Dec. 2, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Notice of Allowance for U.S. Appl. No. 15/396,475 dated Feb. 5, 2021.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/235,445 dated Mar. 26, 2021.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Application Serial No. 16/902,//5 dated Apr. 26, 2021.
Corrected Notice of Allowance for U.S. Application Serial No. 16/902,//5 dated Apr. 9, 2021.
Final Office Action for U. S. U.S. Appl. No. 15/988,572 dated May 12, 2021.
Non-Final Office Action for U.S. Appl. No. 15/396,468 dated Jun. 1, 2021.
Non-Final Office Action for U.S. Appl. No. 15/988,492 dated Apr. 14, 2021.
Non-Final Office Action for U.S. Appl. No. 16/854,970 dated Mar. 17, 2021.
Notice of Allowance for U.S. Appl. No. 15/986,406 dated Mar. 3, 2021.
Supplemental Notice of Allowance for U.S. Appl. No. 15/986,406 dated Apr. 7, 2021.
Corrected Notice of Allowability for U.S. Appl. No. 16/230,493 dated Jul. 8, 2021.
Corrected Notice of Allowance for U.S. Appl. 16/902,775 dated Jul. 30, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Notice of Allowance for U.S. Appl. No. 16/229,614 dated Jun. 29, 2021.
Corrected Notice of Allowance for U.S. Appl. No. 16/902,775 dated Jun. 11, 2021.
Non-Final Office Action for U.S. Appl. No. 17/038,323 dated Jul. 1, 2021.
Notice of Allowance for U.S. Appl. No. 15/988,308 dated Jul. 30, 2021.
Notice of Allowance for U.S. Appl. No. 15/988,492 dated Jul. 30, 2021.
Supplemental Notice of Allowance for U.S. Appl. No. 15/986,406 dated Jun. 9, 2021.

* cited by examiner

MANAGEMENT AND DELIVERY OF OVER-THE-TOP SERVICES OVER DIFFERENT CONTENT-STREAMING SYSTEMS

CROSS-REFERENCE TO RELATED APPLICATIONS/INCORPORATION BY REFERENCE

This Application makes reference to, and claims priority to, and claims benefit from U.S. Application Ser. No. 62/511,190, which was filed on May 25, 2017.

This Application also makes reference to: U.S. application Ser. No. 15/988,572, filed May 24, 2018.

Each of the above stated patent applications is hereby incorporated herein by reference in its entirety.

FIELD OF TECHNOLOGY

Certain embodiments of the present disclosure relate to over-the-top (OTT) services delivery systems. More specifically, certain embodiments of the present disclosure relate to the management and delivery of OTT services over different content-streaming systems.

BACKGROUND

Recent technological advancements in media delivery have paved the way for promoters to target relevant audiences through the delivery of promotional content related to products or services across different media networks, such as linear networks, VOD networks and mobile networks. The media networks maintain a curated repository of media content that is delivered to users across different media platforms under the proprietorship of the media network. The media content is distributed in accordance with a schedule that includes slots dedicated to the promotional content of products or services. The slots can be placed between two segments of the media content or delivered over a defined region of the media content.

The media networks that are proprietors of the media content provide viewership information of the delivered promotional content to associated promotional networks. However, the viewership information does not disclose the intent or interest of the target audience to subscribe to the products or services. Additionally, promoters that prefer to target audiences, for specific periods in a day, want the intent or interest of the viewer in associated products or services for the granular periods of time. For example, a restaurant chain may wish to target audiences at different periods of time, the as before breakfast time, lunch time, and dinner time, to increase the possibility of viewers purchasing from the restaurant. Moreover, the promoters may request to improve the intent of the target audience to purchase promoted products or services.

Currently, the intent to purchase is measured through the detection of impressions or clicks on a promoted media content. However, as the attention span of the audience is short and varied, the impressions or clicks result in lower conversion rates. The impressions or clicks are an imperfect measure of intent during a time when the audience has a transient attention span. The current solutions are inefficient to measure as well as significantly improve the intent or interest of users to purchase the products or services that are promoted through the promotional content. The current solutions disregard the factor of transient attention span that affects the conversion rate of the target audience. Solutions that transform the transient attention to selective sustained attention for viewed promotional content are generally disregarded, and therefore, the intent or the attention span is not improved.

Further limitations and disadvantages of conventional and traditional approaches will become apparent to one skill in the art, through comparison of the systems with some aspects of the present disclosure as set forth in the remainder of the present application with reference to the drawings.

BRIEF SUMMARY OF THE DISCLOSURE

Systems and/or methods are provided for the management and delivery of OTT-services over different' content-streaming systems, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
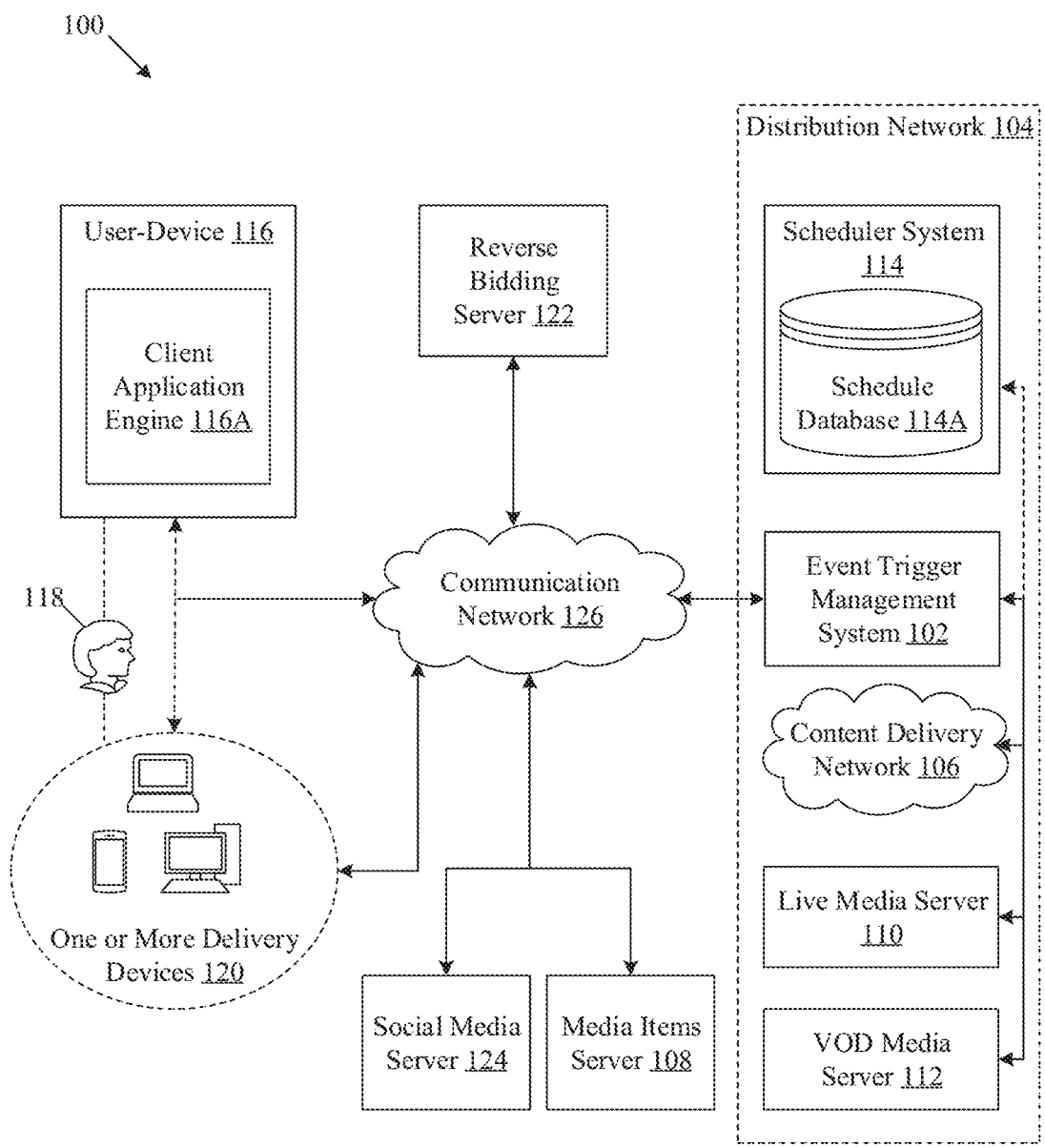
FIG. 1A is a block diagram that illustrates an exemplary network environment for content provider-managed delivery of OTT-services through client application engines managed by the content provider, in accordance with an exemplary embodiment of the disclosure.

Certain embodiments of the present disclosure may be found in a method and system for the management and delivery of over the top (OTT) services through client applications that stream media content from different distribution networks. The media content that is streamed through different distribution networks may include programming media content (for example, television shows, live sports, etc.) and non-programming media items. Examples of the media items may include, but are not limited to, video advertisements, audio advertisements (within podcasts), logos, tickers, bugs, banners, popups, lower third graphics (also referred to as ⅓$^{rd}$ graphics), and sliders. The interactive items may be overlaid over the media content at specified durations as graphic overlays that may behave as responsive buttons or user-selectable buttons, which may be overlaid over the media items, to further receive selections from the user. Every user selection may be regarded as an intent to engage with a product or service offering with the media item, and therefore, a personalized list may be generated and further activated with options for the user, to request different OTT services, such as direct purchases, one-click buy, reverse bid on list items in the personalized list, or share on social platforms. As a user may wish to keep a track of the interested product or service offerings that are promoted with some of the media items, a personalized list may be required that records every selection of the user, gets updated with real-time selections, provides options to the user to request OTT services for specific list items.

The OTT services may be delivered based on event triggers that may be received based on a selection of interactive items overlaid over media items of the streamed media content. The OTT services are services that allow a media content provider to provide audio, video, and other media services (for example, purchase, payment, social sharing, or reverse bidding on products advertised in advertisements) to a consumer over the internet via streaming media, bypassing telecommunications, cable or broadcast television service providers that traditionally act as a controller or distributor of such content. Further, the service provider or an entity that delivers the OTT service may not own a distribution network through which the OTT service is delivered. In some cases, the service provider or an entity that delivers the OTT service may partially or completely own a distribution network through which the OTT service is delivered. For example, a service provider or an entity that delivers the OTT service may deliver the OTT service through a network owned by a different service provider.

One of the challenges relates to a delivery of OTT services to the user when the user watches media content on a client application, where the media content and the client application engine are managed by the same distribution network that further manages the service provider. Another challenge relates to a delivery of OTT services to the user when the user watches media content on a client application, where the media content and the client application engines are managed by distribution networks other than the self-managed distribution network. Thus, there is a need to deliver different OTT services over the top of the media content in a way that the delivery is independent of who manages the media content or the client application.

FIG. 1A is a block diagram that illustrates an exemplary network environment for content provider-managed delivery of OTT services through client application engines managed by the content provider, in accordance with an exemplary embodiment of the disclosure. The services may include options for users to purchase, reverse bid or share preferences on different platforms based on user interactions and associated product or service preferences of the user. In FIG. 1, there is shown a network environment 100 that comprises a distribution network 104, which may further comprise an event trigger management system 102, a content delivery network (hereinafter "CDN") 106, a live media server 110, a Video-On-Demand (VOD) media server 112, and a scheduler system 114. The network environment 100 may further comprise a media items server 108, a user device 116, one or more delivery devices 120, a reverse bidding server 122 and a social media server 124 that may be communicatively coupled to the distribution network 104, via a communication network 126. Additionally, a user 118 may be associated with the user device 116 and the one or more delivery devices 120.

The event trigger management system 102 may comprise suitable logic, circuitry, and interfaces that may be configured to present interactive options on media items, such as promotional graphics, or promotional videos, which may be inserted with the media content streamed on the user device 116. Based on the selection of the interactive options, the event trigger management system 102 may manage delivery of one or more services (also referred to as OTT services) to the user 118. In certain embodiments, the event trigger management system 102 may manage delivery of a plurality of services to the user 118, through the user device 116.

Hereinafter, "a plurality of services" or "a plurality of OTT services" may be referred to as "services" for the sake of brevity. The services may be delivered to the user 118 through the user device 116 or the one or more delivery devices 120 associated with the user 118. In accordance with an embodiment, the event trigger management system 102 may be implemented as an event signaling and management server (ESAM) that operates on different control signals, which may be stored in memory units of media servers dedicated for the distribution network 104. In accordance with an embodiment, the event trigger management system 102 may be implemented as a dedicated control circuitry in the media servers dedicated for the distribution network 104. Operations of the event trigger management system 102 may be managed or operated via rules, policies and definitions specified by the distribution network 104.

The distribution network 104 for media content may be owned and managed by a first service provider that further owns and manages the event trigger management system 102 and the client application engine 116A, operational at the user device 116. The distribution network 104 may comprise suitable logic, circuitry, and interfaces that may be configured to stream the media content to the client application engine 116A, operational at the user device 116, based on a request from the user 118. The distribution network 104 may serve as a content and service delivery and management platform for the first service provider to further render OTT services to different users that may be engaged with the client application engine 116A or the media content of the distribution network 104. The distribution network 104 is responsible for content storage, content encoding, encrypting and packaging, content and service delivery on different client application engines that access the media content on different user devices. The user device may have cross-platform integration with other delivery platforms on other delivery devices.

The CDN 106 may be part of the distribution network 104, and accordingly, owned and managed by the first service provider that further manages the distribution network 104. The CDN 106 may often be referred to as a backend of the distribution network 104, which may comprise a distribution channel, such as a frequency-based distribution channel for a broadcast-based distribution channel, an internet-based distribution channel, or an IPTV-based distribution channel. Examples of the distribution channel may include, but are not limited to, a television channel, a radio channel, a webcasting channel, a social webcasting, and an IP-based channel that may be hosted on a webpage or a client application. The CDN 106 may comprise a distributed and networked chain of one or more media servers, media packagers, media item managers, media ingesters, encoder/decoders, processing engines, schedulers, and subscription management and payment systems. The CDN 106 may be configured to operate as an access platform for a VOD platform, a VOD2Live platform, or linear platforms, for example, broadcast or multicast, such as via an over-the-air content delivery/distribution network, a linear content delivery/distribution network, a cable content delivery/distribution network, a satellite content delivery/distribution network, an Internet Protocol (IP) based content delivery/distribution network, and the like.

The media items server 108 may be managed by a third service provider that may be different from the first service provider and may be further communicatively coupled to the distribution network 104, via the communication network 126. The media items server 108 may comprise suitable logic, circuitry, and interfaces that may be configured to store and distribute one or more media items for insertion within one or more slots of the media content, to media packagers at the CDN 106 of the distribution network 104. In certain embodiments, the media items server 108 may provide a plurality of media items for insertion within a plurality of slots in the media content. Hereinafter, "the plurality of media items" may be interchangeably referred to as "media items." The media items may be provided to the CDN 106, to package the media items with the media content of the distribution network 104. The media items server 108 may be part of a media item network that may be associated with media item providers, such as advertisers, product/service owners, and content providers. A repository of the media items may be managed by the media items server 108, in which each media item may correspond to promotional content for an offering, such as a product offering or a service offering.

The live media server 110 may be a part of the distribution network 104 that further owns and manages the event trigger management system 102 and the client application engine 116A on the user device 116. The live media server 110 may comprise suitable logic, circuitry, and interfaces that may be configured to store and distribute live media content, such as a live broadcast feed from a distribution channel of the distribution network 104, to the user device 116, through the CDN 106 of the distribution network 104. The live media server 110 may be communicatively coupled to the CDN 106 and the event trigger management system 102, to detect each of the media items that may be played in real time. Further, the live media server 110 may store live media data for each segment of the live media content. The standard to store the live media data may be defined by ISO/IEC13818-1 (MPEG-2). A closed caption data and one or more inbound triggers for the live media stream may be stored in the live media server 110. The live program data may store a media content identifier, a title of a media streamed via the distribution network 104, a segment wise or complete summary of the media streamed via the distribution network 104, a file format, encryption information, a length of the media content, a date and/or time the media content was added to the catalog of media content, and a media content class, for example, a television show, a cartoon program, a movie, a news media, an episode, a game, a clip, a recorded sports event, interactive media, and/or the like.

The VOD media server 112 may be a part of the distribution network 104 that further owns and manages the event trigger management system 102 and the client application engine 116A. The VOD media server 112 may comprise suitable logic, circuitry, and interfaces that may be configured to store and distribute VOD media content, such as VOD content assembled based on preferences of the user 118, to the user device 116, through the CDN 106 of the distribution network 104. The VOD media content may correspond to on-demand media content, for example, movies, music videos, clips of various shows or programs, which may be assembled, packaged, and viewed as on-demand live content by the user 118. The VOD media server 112 may be a VOD2Live system, which may be communicatively coupled to the CDN 106 and the event trigger management system 102, to detect the media items that may be played in real time with the VOD media content. The slots for playback of the media items may be pre-scheduled for the VOD media content, and therefore, each media item may be determined from records of the media items.

Further, the VOD media server 112 may store VOD media data, which may be associated with a storage standard. The storage standard may be defined by ISO/IEC 13818-1 (MPEG-2). Closed caption data and one or more inbound triggers for the VOD media content may be stored in the VOD media server 112. The VOD program data may store a VOD media content identifier, a title of the VOD media content, a summary of the VOD content, a file format, encryption information, length of the media content, a date and/or time the media content was added to the catalog of media content, a new content indicator for the media content (e.g., a new VOD asset that became available within the last 24 hours, last few days, last week, and/or the like), and a media content class, for example, a television show, a cartoon program, a movie, a news media, an episode, a game, a clip, a recorded sports event, interactive media, and/or the like.

The scheduler system 114 may be a part of the distribution network 104 that may be owned and managed by the first service provider, which further owns and manages the distribution network 104 and the client application engine 116A. The scheduler system 114 may comprise suitable logic, circuitry, and interfaces that may be configured to manage, store and generate a schedule for a playback of the media items and the programming media content in a schedule database 114A. The schedule may comprise a playback start time, a playback end time, playback duration, a responsive/playback behavior, context tags, item IDs, and other metadata for each of the media items. The schedule may be further partially or fully mapped in client manifests and associated item identifiers (for example, Ad-IDs) for the media items. The generated schedule for the media content may define which media item may be scheduled for which slot. The schedule may be based on various factors, such as topics, sentiments, user constraints, media constraints, audience or user preferences, or social media data. In accordance with an embodiment, the scheduler system 114 may generate a data file, such as a text file or an XML file, which may map each media item to specified playback duration, the item identifier or the offerings promoted through the media item. The scheduler system 114 may receive a media streaming schedule for the user 118 from the distribution network 104 and may modify the received media streaming schedule to dynamically generate a schedule driven by aforementioned factors in real time or near-real time.

The schedule database 114A may comprise suitable logic, circuitry, and interfaces that may be configured to modify and store records that correspond to the schedule of the media items and programs (or the programming media content). The schedule database 114A may further store and update the schedule, such as the playback start time, the playback end time, the playback duration, and attributes, such as the item identifier, context tags, title, offering (product offering or service offering) information, uniform resource indicators (URIs), or URLs, or associated graphics and metadata, for each media item in the schedule database 114A. The attributes may be retrieved from the attribute database of the media items server 108. The schedule database 114A may be a structured or an unstructured database that may be manageable via a database management system. The database management system for the schedule database 114A may be a relational database management system or a non-relational database management system. The relational database management system may define a relational or a structured schema (for example Structured Query Language (SQL)) for the schedule database 114A. Alternatively, the non-relational database management system may define a non-relational or an unstructured schema (for example Non-SQL (NoSQL)) for storage of the schedule database 114A.

The user device 116 may comprise suitable logic, circuitry, and interfaces that may be configured to execute operations to stream, decode, and execute playback of the media content at the user device 116. The media content may further include the programming media content embedded with the media items. The operations may be executed by various operational components of the user device 116 in conjunction with a graphical processing unit (GPU) or a graphical computation circuitry within the user device 116. Examples of the operations may include, but are not limited to, media decryption, encoding overlay interactive items, responsive behavior of overlay interactive items, media content decoding, secure authentication, content recognition, and user notifications. In accordance with an embodiment, the user device 116 may facilitate the presentation of the media content as well as personalized lists of offerings through peripheral display devices, for example, televisions and standalone display screens. For such configurations, the user device 116 may be a media player device without a display screen, for example, Amazon Fire TV, Apple TV, Android TV, and Amazon Fire Stick. In other embodiments, the user device 116 may be integrated with the display device. Examples of the user device 116 may include, but are not limited to, a Set-Top-Box (STB), an IPTV, a hybrid box, a cable converter, a smartphone, a laptop, and a tablet, a smart TV, an internet TV, a portable console-based media player.

The user device 116 may be associated with a device identifier that may be a unique identifier for the user 118 associated with the user device 116. The device identifier may be used by the event trigger management system 102 to discretely personalize delivery of the media content and the interactive items at the user device 116. Examples of the device identifier may include, but are not limited to, an International Mobile Equipment Identity (IMEI) number, Android ID, Apple ID, Advertising Identifier (IDFA), Advertising Identifier (AID), Unique Device Identifier (UDID), mobile number, and medium access control (MAC) identifier (MacID). The user device 116 may receive the media stream of the media content, via a distribution channel. Examples of the distribution channel may include, but are not limited to, satellite broadcast, cable distribution, an IPTV network, and digital terrestrial television network.

A client application engine 116A may be further configured on the user device 116 and may be communicatively coupled to the display device associated with the user device 116. It may be noted that the client application engine 116A may be shown to be integrated with the user device 116; however, those skilled in the art would appreciate that the client application engine 116A may be present on a cloud or remote application server.

The client application engine 116A may be managed and operated by the first service provider that further owns, operates, and manages all components of the distribution network 104. The client application engine 116A may comprise suitable logic, circuitry, and interfaces that may be configured to operate as a computational engine of a media player for the playback of the media content as received from the CDN 106 of the distribution network 104. The client application engine 116A may facilitate the playback of the media content and an overlay of interactive items over the media content. The playback of the media content may facilitate a reception of event triggers for the selection of the overlaid interactive items. The operations at the client application engine 116A may be coordinated and managed by the event trigger management system 102. In one scenario, the client application engine 116A may be associated with a media application, such as a web application or a mobile media application, which may further comprise a media player to play the media content and overlay interactive items based on control signals from the event trigger management system 102.

The one or more delivery devices 120 may comprise suitable logic, circuitry, and interfaces that may be configured to receive and/or render at least a personalized list and associated promotional content over at least one delivery platform accessible on the one or more delivery devices 120. The one or more delivery platforms may be a communication platform that may incorporate visual, audible or an executable data to provide at least the personalized list or associated promotional content to the user 118. Examples of the one or more delivery platforms may include, but are not limited to, an email platform, a mobile messaging platform, a web platform, a podcast, and a push notification-based platform. The promotional content or the personalized list may be received by the one or more delivery devices 120, to notify the user 118 about the selections of the product offerings or service offerings, which may be selected by the user 118 during playback of the media content. Examples of the one or more delivery devices 120 may include smartphones, smart TVs, tablets, smart watches, and other portable or non-portable devices.

The reverse bidding server 122 may comprise suitable logic, circuitry, and interfaces that may be configured to facilitate the user 118 to reverse bid on one or more list items in the generated personalized list. The reverse bid may be utilized for a negotiation with one or more sellers, to purchase or rent the offering added in the personalized list. The one or more list items may correspond to product offerings or service offerings that may be promoted with the media content of the distribution network 104. For example, a user (Rob) may select an interactive item, such as a graphical slider button, which may be overlaid over a media item, such as a banner of a "Smartphone Insurance Plan" offering. The user (Rob) may intend to provide a quote on a desired investment sum of "2 USD per month" for the service offering with an investment period of "24 months." The personalized list may be provisioned with a user-selectable option to provide a reverse bid to a seller of the service offering. The reverse bid may correspond to a price that the user (Rob) is willing to pay for the product. Based on the provided reverse bid on the product offering, the seller may accept or reject the reverse bid. Alternatively, the seller may be facilitated with an option to renegotiate on the reverse bid on the product offering. The provision to provide and negotiate over the price of the product offering may be managed by the reverse bidding server 122 with due access of the client application engine 116A or associated one or more delivery devices 120.

The social media server 124 may comprise suitable logic, circuitry, and interfaces that may be configured to facilitate the user 118 to share the one or more list items in the personalized list to a group of users on a social platform. The social platform may correspond to a networking platform where a group of users can network and/or interact with each other. For example, a chat application or a social networking website may be a social platform for the user 118. The one or more list items may correspond to the product offerings or the service offerings that may be promoted with the media content of the distribution network 104. For example, a user (Bob) may select an interactive item, such as a graphical swipe-button, that may be overlaid over a media item, such as a logo of a "Health Capsule Brand" within the video advertisement of the "Health Capsule Brand." The user (Bob) may intend to share a purchase or pool funds for the product offering. The personalized list may be provisioned with a user-selectable option to share a list item for the "Health Capsule" on the social platform. The user (Bob) may provide a request to the social media server 124, to pool funds for a shared product offering on the social platform. The social media server 124 may generate notifications for the user based on addition of funds to a fund pool or responses on the shared list item. The provision to share and pool funds for the product offering may be managed by the social media server 124.

The communication network 126 may comprise suitable logic, circuitry, and interfaces that may be configured to provide a plurality of network ports and a plurality of communication channels for transmission and reception of communication data. The communication data may correspond to data received and/or exchanged, via the communication network 126, among the event trigger management system 102, distribution network 104, the CDN 106, the user device 116, the reverse bidding server 122, and the social media server 124. Each network port may be associated with a virtual address (or a physical machine address) for the transmission and reception of the communication data. For example, the virtual address may be an Internet Protocol version 4 (IPV4) or an Internet Protocol version 6 (IPV6) address and the physical address may be a media access control (MAC) address.

The communication data may be transmitted via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT). The communication data may be transmitted via at least one communication channel of the plurality of communication channels. The communication channels may include, but are not limited to, a wireless channel, a wired channel, and a combination of wireless and wired channel thereof. The wireless or wired channel may be associated with a data standard which may be defined by one of a Satellite Network, Local Area Network (LAN), a Personal Area Network (PAN), a Wireless Local Area Network (WLAN), a Wireless Sensor Network (WSN), Wireless Area Network (WAN) and Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 126 may be the satellite-based network. For these networks, a broadcast standard may be used, for example, National Television System Committee (NTSC), Phase Alternating Line (PAL), (Sequential Color and Memory) SECAM, Moving Picture Experts Group (MPEG), and (Digital Video Broadcasting) DVB-S/DVB-S2 or Integrated Services Digital Broadcasting (ISDB-S).

In operation, the user 118 may raise a request to access the client application engine 116A, operational on the user device 116, via a control mechanism of the user device 116. The request may further comprise a request to access the media content from the distribution network 104. The request may be transmitted to the event trigger management system 102 of the distribution network 104, via the communication network 126. In certain embodiments, authentication of the request may be based on one of subscription-based access, secure access, freemium-based access, and billed access to the media content on the client application engine 116A.

The request may further be an access request for one of a broadcast channel (on a regular TV or a smart TV), an internet-based media distribution channel, an IPTV network, and the like. User authentication data of the user 118 may be transmitted to the event trigger management system 102 and the CDN 106, via the communication network 126. The user 118 may be authenticated by the CDN 106 or the event trigger management system 102 based on validation of the user authentication data and the received request to access the media content of the distribution network 104.

The request to access the media content may be further associated with a request time, which may define an access time to stream the media content as per the type of the media content, such as VOD media content and linear media content. The type of the media content may be assessed by the event trigger management system 102 to identify a strategy to manage and render services, such as OTT services over the media content. In certain embodiments, the type of media content may be a linear media content. The linear media content may be further classified into linear scheduled media content and live media content. In other embodiments, the type of media stream may be non-linear media content, for example, VOD media content, streamed through an IP-based or a satellite-based network.

In certain embodiments, the media content may be a combination of programming media content and non-programming media content, which may be provided to the user 118 via a distribution service. The distribution service may be at least one of a unicast, multicast, broadcast, or simulcast service. In accordance with an embodiment, an encoder at the CDN 106 may encode the media content using an adaptive bitrate streaming (ABR) technique based on an availability of a network-bandwidth for the user device 116. Examples of the ABR technique may include, but are not limited to, HTTP Dynamic Streaming (HDS), Dynamic Adaptive Streaming over HTTP (DASH), Smooth, Progressive, and HTTP Live Streaming (HLS) streaming techniques. The CDN 106 may transmit the requested media content inserted with the media items to the user device 116, via the communication network 126. After a reception of the requested media content, the client application engine 116A at the user device 116 may be configured to decode and display the programming media content and non-programming media content (media items) on the display device associated with the user device 116.

As the distribution network 104 owns and manages the CDN 106, the event trigger management system 102 may advantageously identify a set of programs from a schedule of the programming media content and media items, which may be scheduled to be streamed as the media content of the distribution network 104. Therefore, the schedule of the programming media content and associated one or more attributes of the media items may be retrieved from the schedule database 114A of the scheduler system 114. Such schedule may specify a playback start time and a playback end time of each media item that is further assigned an item identifier (for example, Ad ID) in the schedule.

The event trigger management system 102 may be further configured to determine the media items that may be present in the media content of the distribution network 104. The determination of the media items may correspond to a determination of the one or more attributes of the media items, for example, title, playback duration, format, codec, resolution, size, item identifier (for example, AD ID) and the like. In certain embodiments, the media items may be determined at the distribution network 104, prior to packaging of the media items at a defined set of slots within the scheduled set of programs of the media content. In such implementation, the schedule database 114A may comprise a schedule record for each slot or a specific media item, where each slot may specify duration of playback of the specified media item with the playback of the media content, at the user device 116. Each slot for the playback of a media item in the media content may be defined based on a tag or a message inserted with the media content at the specific slot. The tags may be inserted as per a broadcast standard, such as Society of Cable Telecom Engineers (SCTE)-224 standard or SCTE-35 messages. Details or metadata for each tag may be present in a client manifest transmitted with the media content to the user device 116.

In other embodiments, the media items may be determined when the media content may be decoded at the user device 116. The media items may be determined after packaging the media items at the defined set of slots in the scheduled set of programs of the media content. The schedule database 114A that may comprise metadata of each inserted media item and associated schedule may be generated and stored for the packaged media content. In some implementations, the event trigger management system 102 may insert, and detect SCTE-35 media start and SCTE-35 media end messages at the playback time of the media content, to determine a playback time of each of the media items at the user device 116.

The event trigger management system 102 may further generate one or more interactive items for the determined media items in the media content. In some implementations, the event trigger management system 102 may further generate a plurality of interactive items for the determined media items in the media content. Hereinafter, "the plurality of interactive items" may be interchangeably referred to as "interactive items." The generated interactive items may comprise trigger components that may facilitate an interaction of the user 118 with such generated interactive items.

The event trigger management system 102 may be further configured to transmit the generated interactive items to the user device 116, operational with the client application engine 116A, via the communication network 126. The event trigger management system 102 may be configured to overlay the interactive items over the determined media items within the media content of the distribution network 104, through the client application engine 116A on the user device 116. Alternatively stated, the media player or the client application engine 116A at the user device 116 may be instructed, via control signals, by the event trigger management system 102, to overlay the interactive items over the determined media items. In certain embodiments, such interactive items may be overlaid at the playback time of the media items within the media content, at the user device 116. In other embodiments, such interactive items may be overlaid prior to playback time of the media items with the media content at the user device 116.

One or more event triggers may be received by the event trigger management system 102 from the client application engine 116A, for the selection of the interactive items overlaid over the media items within the media content, at the user device 116. In certain implementations, the event trigger management system 102 may receive a plurality of event triggers from the client application engine 116A, for selection of the interactive items overlaid over the media items within the media content, at the user device 116. Hereinafter, "the plurality of event triggers" may be interchangeably referred to as "event triggers." Each event trigger may provide a measure of intent of the user 118 to engage with a product offering or a service offering promoted through the media items of the media content.

A personalized list may be further generated based on the received event triggers for the interactive items, overlaid over the media items of the media content. The personalized list may be generated by the event trigger management system 102, in conjunction inputs from the client application engine 116A at the user device 116. The generated personalized list may comprise one or more list items such that each list item may specify a product offering or a service offering for a specific media item presented with the media content, at the user device 116. Alternatively stated, the personalized list may comprise an ordered or unordered list of product offerings or service offerings for the user-triggered interactive items.

The event trigger management system 102 may be further configured to display the generated personalized list with the media content, at a user interface of the user device 116. The personalized list may be displayed based on an overlay of the generated personalized list over the media content, presented at the user interface of the user device 116. The generated personalized list over the media content may be displayed for defined time duration, for example, "15 seconds" of display time duration for a personalized list (Pi) that comprises list items "X1_product", "X2_service", and "X3_offer." Additionally, the event trigger management system 102 may push the generated personalized on one or more delivery platforms available on the one or more delivery devices 120 associated with the user 118.

The event trigger management system 102 may be further configured to deliver the services on the one or more delivery platforms that may be accessible to the user 118 or at the user device 116 associated with the user 118. The delivery of the services may be based on a selection of one or more user-selectable options in the personalized list, which may be displayed with the media content, at the user device 116 or at the one or more delivery platforms accessible on the one or more delivery devices 120.

The client application engine 116A via instructions of the event trigger management system 102 may activate the one or more user-selectable options for the one or more list items of the personalized list. The activation of the one or more user-selectable options may be executed in accordance with one of user preferences of the user 118, past footprints (or activities over web/client-applications) of the user 118, applicable options for a specific list item, demographic factors, inventory/stock availability, and other factors.

The user-selectable option may selected by the user 118 as a request to the event trigger management system 102 to deliver the services to the user 118. The selection of each user-selectable option may be communicated to the event trigger management system 102 as a user-defined request to manage delivery of a selected service. The services may include, but are not limited to, options to share list items on a social platform, purchase list items, pool funds for list items, reverse bid for list items and modify list items in the personalized list. The selections may be provided through an (Input/Output) I/O circuitry, such as a touch-based circuitry, a voice-based circuitry, a sound-based circuitry, a gesture-based circuitry, and a haptic-based circuitry of the user device 116 or the one or more delivery devices 120.

For a selection of a user-selectable option to share the one or more list items to a group of users on a social platform, the social media server 124 may facilitate the client application engine 116A of the user device 116, to share the selected one or more list items to the group of users on the social platform. Some operations of the social media server 124 may be executed at the client application engine 116A, in accordance with certain API-level integration of the user device 116 and/or the client application engine 116A with the social media server 124. In one case, the group of users may be associated with the user 118 that selects the user-selectable option to share the one or more list items to the group of users on the social platform. In another case, the group of users may be listed in a public list (i.e. with public access) that may be published by the user 118 on the social platform.

A notification for the selection of the user-selectable option and successful sharing of the selected one or more list items may be delivered to the user device 116 or the one or more delivery devices 120 associated with the user 118. Similarly, for a selection of another user-selectable option to reverse bid for one of the list items, the reverse bidding server 122 may facilitate the client application engine 116A of the user device 116, to provide a reverse bid for the selected one or more list items. Every time a reverse bid may be provided, the reverse bidding server 122 may facilitate a seller of the list item, to accept, negotiate, or reject the reverse bid.

The event trigger management system 102 may update the personalized list with each selection of an interactive item or a user-selectable option. An updated personalized list may be communicated to the client application engine 116A or the one or more delivery platforms, for a display of the updated personalized list with the media content. For example, the updated personalized list may be communicated in a push notification to the client application engine 116A. The detailed operation of the event trigger management system 102 may be described, for example, in FIG. 2.

It may be noted that the event trigger management system 102, the CDN 106, and the client application engine 116A may adhere to rules, policies, control logic, or circuitry of the entire distribution network 104 that may be managed and owned by the first service provider, without a deviation from the scope of disclosure.

Figure 1B:
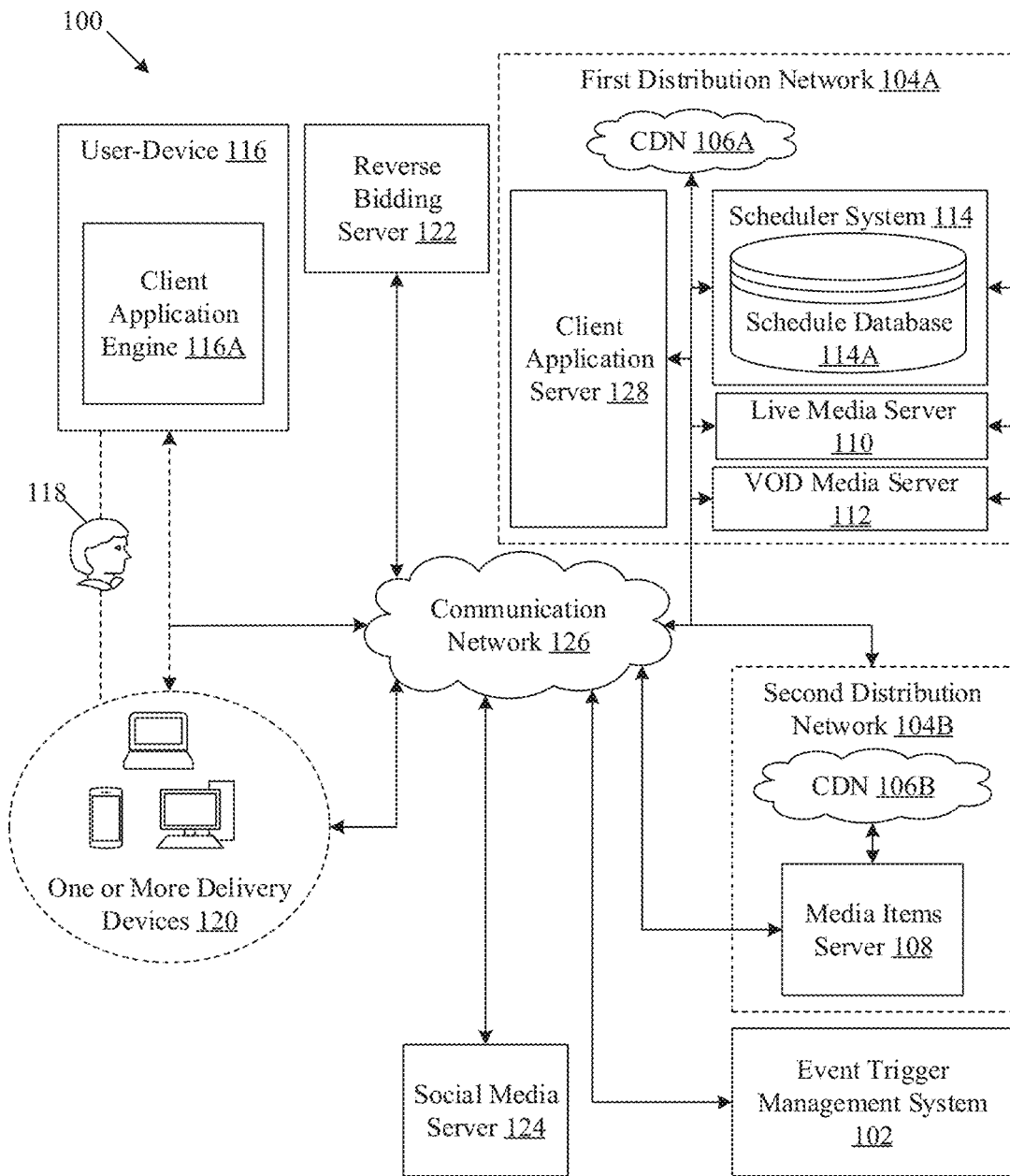
FIG. 1B is a block diagram that illustrates an exemplary network environment for delivery of OTT services on third-service-provider client application engines that stream media content from third-service-provider content providers, in accordance with an exemplary embodiment of the disclosure.

FIG. 1B is a block diagram that illustrates an exemplary network environment for delivery of OTT services through third-service-provider client application engines that stream media content from third-service-provider content providers, in accordance with another exemplary embodiment of the disclosure. FIG. 1B shows an alternate configuration of the network environment 100. The network environment 100 comprises the event trigger management system 102, a first distribution network 104A, a second distribution network 104B, the user device 116, the one or more delivery devices 120, the reverse bidding server 122, and the social media server 124, communicatively coupled to each other, via the communication network 126.

In such network configuration, the first-service-provider-managed event trigger management system 102 may act as OTT service facilitator/provider for the second-service-provider-managed first distribution network 104A and the third-service-provider-managed second distribution network 104B. Alternatively stated, the first distribution network 104A may stream the programming media content to the user device 116 and the second distribution network 104B may provide the media items (programming or non-programming) to the first distribution network 104A or the event trigger management system 102, for presentation of the media items with the media content, at the user device 116. The first-service-provider-managed event trigger management system 102 may control/facilitate delivery of services, for example, wishlist generation over-the-top of the second-service-provider-managed media content, overlay of the interactive items, purchasing product or service offerings from the generated wishlist, provide reverse bids on the wishlist items, share list items on social platforms or receive notifications on selected product or service offerings.

The first distribution network 104A may be a programming media network that may be owned and managed by a second service provider and the second distribution network 104B may be a non-programming media network (for example, a large advertisement distribution network (programmatic or non-programmatic advertisements) that may be owned and managed by a third service provider.

The first distribution network 104A may include a CDN 106A, the live media server 110, the VOD media server 112, the scheduler system 114, and a client application server 128 for the client application engine 116A. Operations of the second-service-provider-managed first distribution network 104A may be same as the operations of the first-service-provider-managed distribution network 104, as described in FIG. 1A.

The second distribution network 104B may include a CDN 106B and the media items server 108. The second distribution network 104B may be configured to provide the media items to the first distribution network 104A or the event trigger management system 102 for playback, along with the media content at the user device 116. Operations of the third-service-provider-managed second distribution network 104B may be same as the operations of the first-service-provider-managed distribution network 104, as described in FIG. 1A. In some embodiments, instead of the first distribution network 104A and the second distribution network, an integrated distribution network may be present as a common distributor of the programming media content and non-programming media content (for example, ad videos, bugs, overlay graphics) and a service consumer to a service provider associated with the event trigger management system 102.

The operations of the CDN 106A, the live media server 110, the VOD media server 112, and the scheduler system 114 of the first distribution network 104A may be same as the operations of the CDN 106, the live media server 110, the VOD media server 112, and the scheduler system 114 of the distribution network 104, as described in FIG. 1A. Similarly, the operations of the CDN 106B of the second distribution network 104B may be same as the operations of the CDN 106 of the distribution network 104, as described in FIG. 1A.

As the client application engine 116A may be owned and managed by the second service provider, therefore, the second-service-provider-managed first distribution network 104A may utilize the client application server 128 to facilitate integration with the first-service-provider-managed event trigger management system 102. The integrations may provide permissions and control provisions to the event trigger management system 102, to further facilitate delivery of interactive overlay items and associated services through the second-service-provider-managed client application engine 116A. It may be noted that the decisioning related to the interactive items to be overlaid, the media items to be placed between the media content, and the like, may be taken at the first distribution network 104A or the second distribution network 104B. The event trigger management system 102 may only act as a provider of different services on different client applications, without a deviation from the scope of the disclosure.

The client application server 128 may comprise suitable logic, circuitry, and interfaces that may be configured to manage the client application engine 116A, which may pertain to a management of user requests and permissions, resource allocation and data synchronization, request authentication, media or data processing, and other computations on collected data of the user 118. Alternatively stated, the client application server 128 may provide a framework to manage resources, requirements, and assigned tasks of the client application engine 116A. The framework of the client application server 128 may correspond to a programmable environment that manages processes, as well as assigns tasks, specifications, and resources that may be required by the client application engine 116A. Additionally, the client application server 128 may facilitate integration of the second-service-provider-managed client application engine 116A with the first-service-provider-managed event trigger management system 102. The integration may facilitate a controlled access to the media content and associated inter-activities on the client application engine 116A, operational at the user device 116. An application database may be further maintained at the client application server 128 to store the resources, requests, and associated metadata for the client application engine 116A.

In operation, as described in the operation of FIG. 1A, the request from user device 116 may be further utilized by the client application server 128, to request access to the media content from the first distribution network 104A or the second distribution network 104B. The media content may comprise programming media content (set of programs) from the first distribution network 104A and non-programming media content (media items) from the second distribution network 104B.

The requested programming media content may be encoded and packaged for delivery to the user device 116 based on user preferences or a schedule of broadcast for linear media content or live media content. The CDN 106B of the second distribution network 104B may transmit the media items to the CDN 106A of the first distribution network 104A. The requested programming media content may be further packaged with non-programming media content (media items) from the second distribution network 104B. The first distribution network 104A or the second distribution network 104B may implement decision circuitries/engines to determine a set of slots for playback of the media items within the programming media content.

As a service requester, the second-service-provider-managed first distribution network 104A or the third-service-provider-managed second distribution network 104B may request the first-service-provider-managed event trigger management system 102, to render services to the user 118. The request may be made while the media content from the first distribution network 104A and the second distribution network 104B may be played at the user interface of the user device 116. The services may be rendered at the client application engine 116A or the one or more delivery platforms accessible at the one or more delivery devices 120 associated with the user 118.

The first-service-provider-managed event trigger management system 102 may request access and control of the client application engine 116A, operational at the user device 116, in response to the request from the second-service-provider-managed first distribution network 104A or the third-service-provider-managed second distribution network 104B.

In accordance with an embodiment, the second service provider that manages the first distribution network 104A may further manage the client application engine 116A (as shown in FIG. 1A). In such a case, the request to grant access and control over the client application engine 116A may be routed to the first distribution network 104A. In accordance with an embodiment, the third service provider that manages the second distribution network 104B may manage the client application engine 116A. In such a case, the request to grant access and control over the client application engine 116A may be routed to the second distribution network 104B. In accordance with an embodiment, networks different from the first distribution network 104A and the second distribution network 104B may manage the operations of the client application engine 116A. For such a case, the request to grant access and control over the client application engine 116A may be routed to the networks.

The event trigger management system 102 may be further configured to determine the media items that may be present in the media content of the first distribution network 104A or the second distribution network 104B. The determination of the media items may correspond to a determination of the schedule (for example, playback duration, start time, and end time) and one or more attributes of the media items, for example, title, format, codec, resolution, size, item identifier and the like. The schedule and the one or more attributes of the media items may be determined via different techniques, under different content delivery strategies selected by the first distribution network 104A and the second distribution network 104B (as discussed in detail in FIG. 2).

The event trigger management system 102 may further generate the interactive items for the determined media items in the media content of the first distribution network 104A or the second distribution network 104B. The generated interactive items may comprise trigger components that may be activated at the user device 116, to facilitate the user 118 to interact with the generated interactive items. The generated interactive items may be served to the first distribution network 104A, the second distribution network 104B or directly to the client application engine 116A, for an overlay over the media items, in accordance with a content delivery scenario selected by the first distribution network 104A or the second distribution network 104B. The content delivery scenario from different content delivery scenarios may be selected such that the media content, the interactive items, and the OTT services may be rendered advantageously with efficient utilization of a network bandwidth, minimal device-performance degradation, and optimal computational resource utilization for the first distribution network 104A or the second distribution network 104B.

In a first content delivery scenario, the event trigger management system 102 may overlay the generated interactive items over the media items in the media content, which may be played at the user device 116. The interactive items may be overlaid with support from the network-provided or content recognition-based schedule and attributes of the media items. In a second content delivery scenario, the first distribution network 104A or the second distribution network 104B may provide a defined list of media items, which may not comprise the schedule of the media items. Therefore, the event trigger management system 102 may provide detectable identifiers, for example, SCTE-35 messages, ID3 tags, or beacons (infrasonic/ultrasonic/audible), for each media item, to the first distribution network 104A or the second distribution network 104B. Each of the detectable item identifiers may be inserted, by the first distribution network 104A or the second distribution network 104B, at a slot that specifies the playback time of the media items in the media content. The item identifier may correspond to an audio-based, an image-based beacon, or a data-based beacon that may be inserted or encoded with the media items to be packaged with the media content. Such item identifier may be derived from the media items.

In a third content delivery scenario, the event trigger management system 102 may insert the interactive items in the received media content of the first distribution network 104A or the second distribution network 104B, based on the schedule provided by the first distribution network 104A or the second distribution network 104B. Further operations of the event trigger management system 102 is same as described in FIG. 1A, and different operational configurations and associated details may be covered in FIG. 2.

Figure 2:
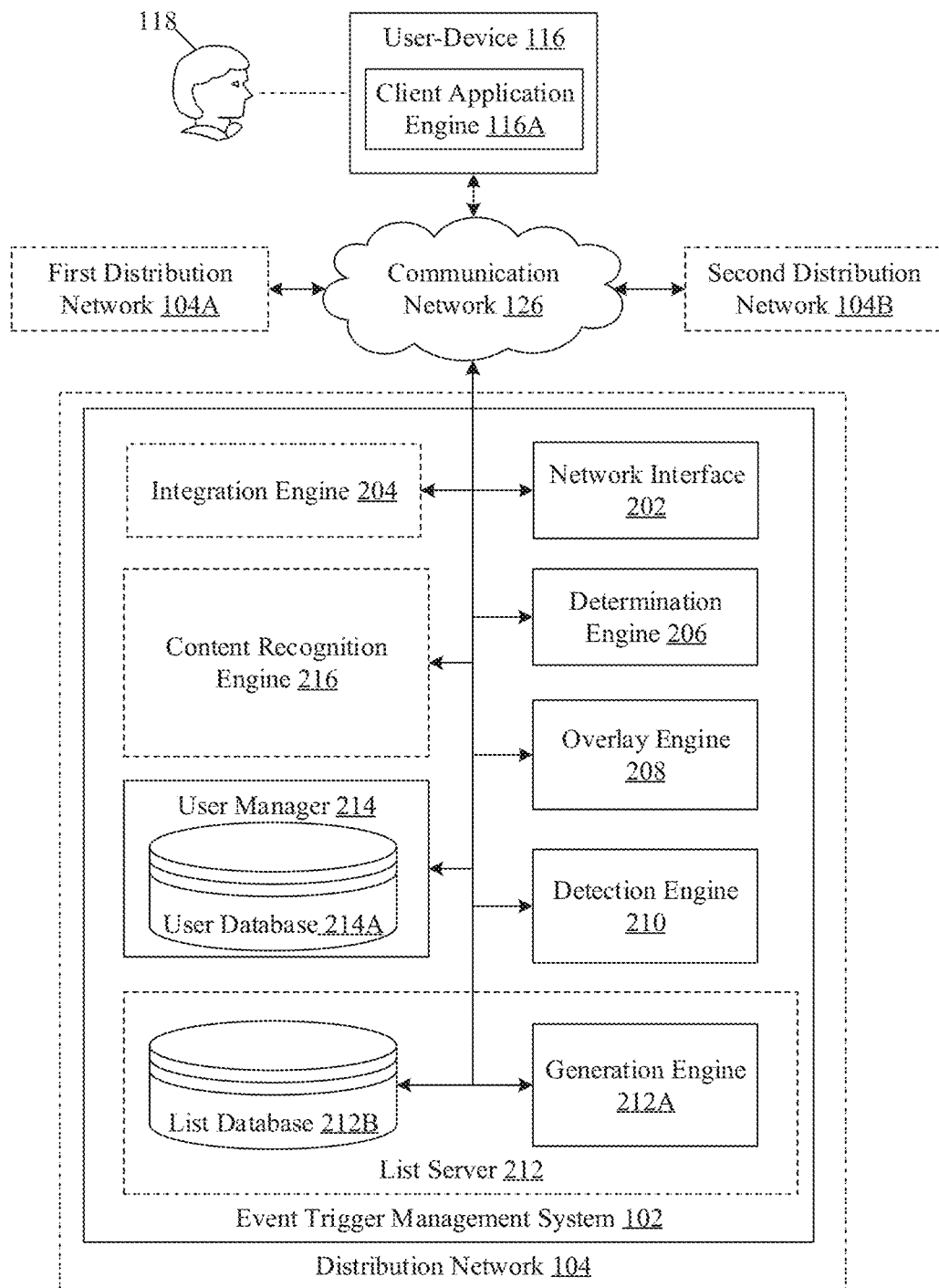
FIG. 2 is a block diagram that illustrates an exemplary event trigger management system under different operational configurations, for delivery of OTT services through client application engines, in accordance with an exemplary embodiment of the disclosure.

FIG. 2 is a block diagram that collectively illustrates an exemplary event trigger management system for delivery of OTT services through client application engines managed by one of a first service provider, a second service provider or a third service provider, in accordance with various exemplary embodiments of the disclosure. In accordance with an embodiment, FIG. 2 shows the event trigger management system 102 that comprises a network interface 202, a determination engine 206, an overlay engine 208, a detection engine 210, a list server 212, and a user manager 214. In accordance with another embodiment, the event trigger management system 102 may further comprise an integration engine 204 and a content recognition (CR) engine 216, communicatively coupled to the network interface 202, the determination engine 206, the overlay engine 208, the detection engine 210, the list server 212, and the user manager 214. The event trigger management system 102 may be communicatively coupled to the user device 116 and either of the distribution network 104 or the first distribution network 104A and the second distribution network 104B, under different operational configurations.

The network interface 202 may comprise suitable logic, circuitry, and interfaces that may be configured to communicate with various computing devices, via the communication network 126. The network interface 202 may be implemented by use of known technologies to support wired or wireless communication among the event trigger management system 102 and the various computing devices. Components of the network interface 202 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The integration engine 204 may be operational at the event trigger management system 102 only when the first-service-provider-managed event trigger management system 102 may function as a service provider to distribution networks that may be different from the distribution network 104, such as the first distribution network 104A and the second distribution network 104B. In such operational configuration, the integration engine 204 may comprise suitable logic, circuitry, and interfaces that may be configured to provide the event trigger management system 102 with a controlled access to the client application engine 116A or the client application server 128 associated with the client application engine 116A. The integration engine 204 may share rights and permissions and bridge API-level access and control of the client application engine 116A, with the event trigger management system 102. The API-level access may be bridged based on API-keys or authentication information shared among the client application server 128, the integration engine 204, the event trigger management system 102 or the client application engine 116A. In certain embodiments, the integration engine 204 may be implemented as a specialized circuitry or an application on the event trigger management system 102.

The determination engine 206 may comprise suitable logic, circuitry, and interfaces that may be configured to determine media items within the media content that may be scheduled for playback at the client device. The determination of the media items may be based on a determination of a schedule, such as playback start time, playback end time and playback duration and one or more attributes, such as a title, an item identifier and a codec of the playback of the media items within the media content. The determination may facilitate the identification of promotional opportunities, which may be utilized to selectively target the user 118 with interactive items and obtain event triggers over the selection of the interactive items. In certain embodiments, the determination engine 206 may be implemented as a specialized circuitry or an application at the event trigger management system 102. For such implementations, the determination engine 206 may utilize computational resources of a graphical processing unit (GPU) or the CR engine 216 of event trigger management system 102.

The overlay engine 208 may comprise suitable logic, circuitry, and interfaces that may be configured to manage operations associated with an overlay of the interactive items over the determined media items in the media content, at the user device 116. Each interactive item to be overlaid over a specific media item may be a graphically responsive item that may be associated with one or more options, such as discounts, promo codes, purchase options, and list generation options, for a generation of the event triggers. In certain embodiments, the overlay engine 208 may be implemented as a specialized graphics circuitry or a graphic-rendering application at the event trigger management system 102. For such implementation, the overlay engine 208 may utilize computational resources of the GPU or the CR engine 216 of the event trigger management system 102.

The detection engine 210 may comprise suitable logic, circuitry, and interfaces that may be configured to receive the event triggers from the client application engine 116A operational at the user device 116. The event triggers may be received in response to the selections of the interactive items presented over the media items of the media content, at the client application engine 116A on the user device 116. The selection of the media items may be facilitated based on at least one of a touch input, a gesture input, a haptic feedback input, a voice input, or a specialized circuitry for a real-time wireless selection of the media items. The event triggers may be detected based on a reception of messages or other metadata, such as SCTE-35 messages, at the detection engine 210, for each event trigger generated at the client application engine 116A. In certain embodiments, the detection engine 210 may be implemented as a specialized circuitry or an application at the event trigger management system 102. For such implementations, the detection engine 210 may utilize computational resources of data processing unit of the event trigger management system 102.

The list server 212 may comprise suitable logic, circuitry, and interfaces that may be configured to commit records for the selection of the interactive items and facilitate the generation of a personalized list for the user 118 based on the selections of the interactive items, rendered at the client application engine 116A of the user device 116. The list server 212 may comprise a generation engine 212A and a list database 212B communicatively coupled to the generation engine 212A.

The generation engine 212A may comprise suitable logic, circuitry, and interfaces that may be configured to generate a personalized list for the received event triggers, based on the selection of the interactive items overlaid over the media items of the media content. The generation engine 212A may further facilitate an overlay of the generated personalized list over the media content that may be presented at the user interface of the user device 116.

The list database 212B may comprise suitable logic, circuitry, and interfaces that may be configured to store, commit, and update records that correspond to selection of the interactive items and the one or more user-selectable options. The list database 212B may be further configured to store the generated personalized list and periodically update the one or more list items in the generated personalized list based on selection of the one or more user-selectable options, as displayed with the generated personalized list.

The user manager 214 may comprise suitable logic, circuitry, and interfaces that may be configured to manage processes and requests that may be associated with preferences, activities (or footprints), selections, or profile of the user 118. The preferences, activities, selections, or profile may be stored and managed as user-related data in a user database 214A. In accordance with an embodiment, the preferences, activities (or footprints), selections, or profile of the user 118 may be received from other user data sources when the event trigger management system 102 operates as a service provider to distribution networks, such as the first distribution network 104A or the second distribution network 104B. Every time the user 118 requests, through the client application engine 116A, to access the media content, the request may be communicated, via the network interface 202, to the user manager 214. The user manager 214 may be configured to authenticate the user 118 for the received request through the network interface 202. In certain implementations, the user manager 214 may be configured to facilitate transactions or payments, in conjunction with a transaction system, for the selected one or more list items in the personalized list.

The user database 214A may comprise suitable logic, circuitry, and interfaces that may be configured to store and manage the user-related data in real time. The user-related data may comprise at least a set of user-authentication data, subscription data, preferences of the user 118, and selections of the interactive items. A footprint of the user 118 that may define the activities of the user 118 may be further updated to the user database 214A in real time.

The CR engine 216 may comprise suitable logic, circuitry, and interfaces that may be configured to execute operations associated with content recognition of the media items within the media content, based on instructions/control signals received from the determination engine 206. The CR engine 216 may operate as a statistical signal processing engine that may execute operations for the recognition of the media items in the media content. The CR engine 216 may further identify the one or more attributes of the media items through an implementation of a technique, such as acoustic fingerprinting, digital watermarking, and digital video fingerprinting. In certain implementations, supervised or unsupervised machine learning, deep learning, neural network, or artificially intelligence based techniques may be implemented to facilitate precise determination of the one or more attributes of the media items in the media content. In certain embodiments, the CR engine 216 may be implemented as a specialized circuitry or an application at the event trigger management system 102. For such implementations, the CR engine 216 may utilize computational resources of the GPU at the event trigger management system 102.

In operation, a request to stream the media content may be provided from the client application engine 116A, operational at the user device 116 associated with the user 118. In a first operational configuration, the request may be received at the CDN 106 of the distribution network 104 (as shown in FIG. 1A). In such implementation, event-triggered services may be rendered over-the-top of the media content without integration with the client application engine 116A. In a second operational configuration, the request may be received at the CDN 106A of the first distribution network 104A or at the CDN 106B of the second distribution network 104B. In such implementation, the interactive items and the associated services may be provided over-the-top of the media content with prior integration with the client application engine 116A.

In accordance with the first operational configuration, the request may be received at the network interface 202 of the event trigger management system 102, from the CDN 106 of the distribution network 104. At the event trigger management system 102, the user manager 214 may validate the request and provide a request validation status to each of the CDN 106, the scheduler system 114, the integration engine 204, the determination engine 206, the overlay engine 208, the detection engine 210, and the list server 212. The validation status may be transmitted to the client application engine 116A, to prepare the user interface and other resources for playback of the media content.

The client application engine 116A may comprise a media playback engine that executes operations associated with the playback of the media content, at the user interface of the user device 116. A time of the request from the user device 116 may be recorded at the CDN 106 and the request may be assessed to identify whether the user 118 wants to watch VOD media content, live media content, scheduled linear media content, or a combination thereof. The CDN 106 may transmit the requested media content to the client application engine 116A as per specifications of the received request from the user device 116.

The media content may be associated with a set of promotional opportunities, such that each promotional opportunity of the set of promotional opportunities may specify a time slot in the media content. Each promotional opportunity may be further utilized to present an interactive item over a media item, for a defined duration within the playback duration of the media content. Each of the time slots may be defined between segments of the media content or a specific on-screen region of the media content, for the defined duration, for example, picture-in-picture (PIP) time slot for duration of "10 seconds."

The event trigger management system 102 may be configured to allocate one or more time slots within the media content. The one or more time slots may be allocated based on a static or a dynamic allocation. For a static allocation, the one or more slots may be pre-specified for the one or more programs in the media content. Schedule data and the one or more attributes of the media content may be updated in the schedule database 114A of the scheduler system 114 prior to a reception of the request from the user 118. Therefore, the determination engine 206 may retrieve the schedule and the one or more attributes of the media items that may be scheduled for a playback with the media content.

For a dynamic allocation, the one or more time slots may be dynamically allocated at the request time within the media content. At the same time, the media items may be allocated and thereafter inserted at the dynamically allocated one or more slots in the media content of the distribution network 104. The one or more attributes of the media items, inserted at the dynamically allocated one or more slots, may be updated as a defined list in the schedule database 114A of the scheduler system 114. The determination engine 206 may determine the one or more attributes of the media items for either of the static allocation or the dynamic allocation of the one or more time slots within the media content of the distribution network 104.

For example, a static allocation of the one or more time slots may be executed for a scheduled linear media stream, such as a broadcast television content stream and a dynamic allocation of the one or more slots may be performed for a VOD media stream based on the request from the user 118. A VOD2Live system (not shown) may be used to dynamically allocate the media items for the dynamically allocated one or more time slots within the media content of the distribution network 104.

In certain embodiments, the event trigger management system 102 may be configured to allocate the media items at the one or more time slots within the media content, based on a stored schedule of the one or more programs in the scheduler system 114 of the distribution network 104. Alternatively stated, the event trigger management system 102 may decide what type of media items (or AD media) should be presented at which time slot in the media content. The event trigger management system 102 may also decide the type of interactivity (or interactive overlays) to be presented at a specific time slot and what should be the response from the event trigger management system 102 for the interactions received from the user device 116. In other embodiments, the CDN 106 may make the decisions and operate as an ESAM server for the distribution network 104. The allocated media items may be packaged with the programming media content at the allocated one or more time slots. The media items may be allocated and further selected in accordance with at least one of user preferences, user footprints, demographics, goals, such as a (click-through rate) CTR, (cost per thousand) CPM, impressions, sales, (cost per revenue) CPR, pay-per-click (PPC), or other rules.

At the event trigger management system 102, the determination engine 206 may be configured to determine the media items in the media content of the distribution network 104. The determination of the media items may correspond to a determination of the schedule, such as the playback start time, the playback end time, and the playback duration, and the one or more attributes, such as an item identifier, a media format, a file size, a resolution and a codec, of the media items. The item identifier may be one of a standard advertisement identifier, such as Ad ID that may be defined by a 12 digit (Industry Standard Coding Identification) ISCI code, an ID3 metadata that may be associated with each of the media items, or a web-based, an image-based, an audio-based, or a data-based beacon that may be inserted or encoded with the media items to be packaged with the media content. Such item identifier may be derived from the media items. The item identifier may facilitate a unique identification of each product or service offering promoted with the media items of the media content.

Similarly, the playback duration of the media item may provide a time-frame to overlay the interactive items over the media items, which may be streamed at the client application engine 116A. The media format may facilitate the determination of whether the media item is a video item, an audio item or an image item. The behavior or specification of the interactive items may be configured in accordance with the media item format. Additionally, the file size, the resolution or the codec of the media items may vary in accordance with availability of a network bandwidth of the communication network 126. The variation in the file size, resolution or codec may affect behavior, the playback start time, the playback end time or the playback duration of the media items; and therefore, the determination of the file size, the resolution, or the codec used for the media items may facilitate seamless and synchronous overlay of the interactive items, at the user device 116.

As a first example, a media item (A) may exhibit the one or more attributes such as a title "X1" for a product offering of "Furniture X", a playback start time of "00:35:55", a playback end time of "00:36:20", a playback duration of "00:00:25", a media format of "MPEG", an item identifier of "ABCD0001000", and a type of media overlay as "PIP."

As a second example, a media item (B) may exhibit the one or more attributes such as a title "X2" for a product offering of "Car Y", a playback start time of "00:43:15", a playback end time of "00:44:52", a playback duration of "00:01:27", a media format of "JPEG", an item identifier of "ABCD0002000", and a type of media overlay as "Banner."

In certain embodiments, the determination engine 206 may be configured to retrieve the one or more attributes of the media items from the schedule database 114A of the scheduler system 114, without prior integration with the scheduler system 114. Alternatively stated, the one or more attributes of the media items may be determined from a defined list of media items that may be time-scheduled to be inserted within the media content of the distribution network 104. The schedule database 114A may comprise structured or unstructured records for the one or more attributes of each media item in the defined list of media items.

In other embodiments, the determination engine 206 may be configured to execute content recognition of the media content, to identify the one or more attributes of the media items within the media content. The content recognition of the media content may be executed based on an implementation of content recognition techniques that utilize the computational resources of the CR engine 216. A set of digital video fingerprints or a set of digital audio fingerprints from the media content may be obtained by the determination engine 206. The obtained set of digital video fingerprints or the set of digital audio fingerprints may be analyzed to identify the one or more attributes of the media items in the media content. The techniques used for the content recognition of the media content may be known to one skilled in the art, and therefore, such techniques have not been described in detail for the sake of brevity. The records or the defined list of CR-determined media items may be updated in the schedule database 114A of the scheduler system 114.

The determination of the playback start time and the playback end time of the media items within the media content may be relevant for a synchronized delivery of the OTT services over the media content of the distribution network 104. In case of the live media content, the time slot, sequence, the playback start time and the playback end time and the playback duration of each media item may vary with a variation in the availability of the one or more promotional opportunities at the playback time of the live media content. Therefore, attributes of the media items may be determined based on detection of an item identifier that may be packaged with each media item, such as the detection of beacons or SCTE-35 messages, to identify the playback start time and the playback end time of each media item in the live media content.

An item identifier, such as an ID3 tag or an SCTE-35 message, may be inserted with each of the media items, which may be further packaged with the media content. In accordance with an embodiment, the live media server 110 or the media items server 108 may be configured to insert the item identifier with each of the media items prior to a packaging of the media items with the media content at the distribution network 104. At the playback time of a media item, the item identifier for the media item may be detected by the client application engine 116A, in conjunction with the determination engine 206. Additionally, the playback start time, the playback end time, and the playback duration may be determined along with the detection of the item identifier. For each detection, one or more records may be generated that may further comprise the detected item identifier, the playback start time, the playback end time, and the playback duration of each media item in the live media content. The records may be further updated in the schedule database 114A of the scheduler system 114.

In accordance with the second operational configuration, a strategy to determine the one or more attributes of the media items and associated schedule for the playback within the media content may vary with different content delivery scenarios. In a first scenario, the determination engine 206 may receive the schedule and the one or more attributes of the media items from the first distribution network 104A or the second distribution network 104B. The schedule and the one or more attributes may be fetched from the schedule database 114A of the scheduler system 114 at the first distribution network 104A 114 or at the second distribution network 104B. The schedule may comprise a list of programs to be played at the request time for the media content, a playback start time, a playback end time and playback duration of each media item within the requested media content.

In a second scenario, the first distribution network 104A or the second distribution network 104B may request the event trigger management system 102, to trigger interactivities and recognize media items at the user device 116. In such cases, the determination engine 206 may control a CR engine at the user device 116, via API-based integrations, to determine the one or more attributes and the schedule of each media item in the media content of the first distribution network 104A or the second distribution network 104B. A set of digital video fingerprints or a set of digital audio fingerprints from the media content may be obtained at the user device 116. The obtained set of digital video fingerprints or the set of digital audio fingerprints may be analyzed to identify the one or more attributes of the media items in the media content. The techniques used for the content recognition of the media content may be known to one skilled in the art and therefore, such techniques have not been described in detail for the sake of brevity.

In a third scenario, the determination engine 206 may receive a defined list of media items, via the communication network 126, from the first distribution network 104A or the second distribution network 104B. The defined list of media items may comprise at least an item identifier, such as Ad ID, for each media item. As the determination engine 206 may not have direct access to the media content of the first distribution network 104A or the second distribution network 104B, the determination engine 206 may provide one or more executable identifiers, such as an ID3 tag or an SCTE-35 message and the interactive items for the media items, specified in the received list of media items, to the first distribution network 104A or the second distribution network 104B. In accordance with an embodiment, the determination engine 206 may control the insertion of the one or more executable identifiers with the media content at the first distribution network 104A or the second distribution network 104B. The insertions may be controlled based on access and control of the first distribution network 104A, the second distribution network 104B or the client application engine 116A. In accordance with an embodiment, the CDN 106A at the first distribution network 104A and the CDN 106B at the second distribution network 104B may insert the received one or more executable identifiers at one or more time slots for the media items within the media content.

A network address, such as Internet Protocol (IP) address, of the event trigger management system 102 may be transmitted along with the one or more executable identifiers, to the first distribution network 104A and the second distribution network 104B. The network address may be utilized by the first distribution network 104A or the second distribution network 104B, to route requests to generate personalized lists or render other services to the user 118. At the playback time of the media items, each executable identifier may be detected by the client application engine 116A and a request to overlay an interactive item for the media item may be transmitted to the event trigger management system 102, through the network-address that links the event trigger management system 102 to the communication network 126. The playback start time, the playback end time and the playback duration may be detected along with the detection of the one or more executable identifiers. At least one record may be generated for each detection which may comprise the detected executable identifier, the playback start time, the playback end time, and the playback duration of each media item within the media content.

In a fourth scenario, the determination engine 206 may receive the media content from the first distribution network 104A or the second distribution network 104B. In such case, the CR engine 216 may recognize the media items within the received media content and associated one or more attributes with the recognized media items.

In case of the live media content, attributes, such as the time slot, playback sequence, the playback start time and the playback end time and the playback duration, of each media item may vary with the availability of one or more promotional opportunities at the playback time of the live media stream of the first distribution network 104A or the second distribution network 104B. Therefore, the attributes of each media item may be determined from the detection of the one or more executable identifiers, such as SCTE-35 messages or ID3 tags, which may be packaged with each of the media items within the media content. Each of the executable identifiers may be determined at a playback time of each media item in the live media stream. Under integration-based control of the determination engine 206, the client application engine 116A may be configured to identify the playback start time and the playback end time of each media item in the live media content of the first distribution network 104A or the second distribution network 104B.

In accordance with the first operational configuration and the second operational configuration, the overlay engine 208 may be configured to generate the interactive items for the determined media items in the media content. A specification of each interactive item may be generated based on a defined behavior for the interactive items. The specification may include an overlay start time, an overlay end time, a template for a graphical, audio or audio visual presentation, a display size, a region of an on-screen display, and the like.

As an example, a specification of an interactive item (A) for the media item (A) (See First Example) may comprise an item identifier of "ABCD0001000", an overlay text of "Add Furniture X to List", an overlay start time of "00:35:55", an overlay end time of "00:36:20", an overlay duration of "00:00:25", an overlay template of a "transparent button", a display size of "300 pixels×300 pixels", an on-screen position of "(100,400), (400,400), (100,700), (400,700)", and described input of touch or gesture input. As another example, a specification of an interactive item (B) for the media item (B) (See First Example) may comprise an item identifier of "ABCD0001000", an overlay text of "Add Car (Y) & Dealer to List", an overlay start time of "00:38:35", an overlay end time of "00:40:35", an overlay duration of "00:02:00", an overlay template of an "animated button", a display size of "200 pixels×200 pixels", an on-screen position of "(100,300), (300,300), (100,500), (300,500)", and described input of touch or gesture input.

The entries in the specification of each interactive item may be customized as per stored/determined preferences of the user 118. Alternatively, the specification of each interactive item may be customized for at least a geographical region, a public event, a certain section of audience that may satisfy a defined demographic criteria measured on the basis of age, gender, religion, language, wealth, income, and the like.

With reference to the first scenario and the second scenario, as the event trigger management system 102 may be integrated with the client application engine 116A, the overlay engine 208 may control the operations of the client application engine 116A, to overlay the generated interactive items over the determined media items within the media content. Each interactive item may be overlaid for a display at the determined playback duration within the media content. With reference to the third scenario, after the event trigger management system 102 may receive the request through the network address, to overlay the interactive items, the overlay engine 208 may be configured to transmit the generated interactive items for an overlay at the user device 116. The overlay engine 208 may further control the operations of the client application engine 116A, to overlay the transmitted interactive items over the determined media items, at the user device 116.

With reference to the fourth scenario, as the media content is received by the event trigger management system 102, the overlay engine 208 may overlay the generated interactive items over the media items in the received media content and the media content overlaid with the generated interactive items may be transmitted to the first distribution network 104A or the second distribution network 104B.

The overlay engine 208 may be further configured to overlay the generated interactive items over the determined media items of the media content, at the client application engine 116A on the user device 116. For example, a media item, such as a "Beverage Ad Video" of a "Beverage Offering" may be played at a playback time, at the user device 116. The playback time of the "Beverage Ad Video" may be determined by the determination engine 206. A graphical button, which may be captioned as "Add to List", as an interactive item, may be overlaid in a specific region of "Beverage Ad Video." A behavior of the "Add to List" graphical button may be manipulated by the overlay engine 208 in conjunction with the client application engine 116A. The manipulation may be associated with a user experience and a user interface, which may be personalized for the user

118. The user interface may be activated with selection options, such as a touch, click, button-based, sound-based, voice-based, gesture-based, or a specialized circuitry for the selection of the interactive items. For example, an interactive item (P) may display a "microphone icon" near the determined brand-logo of a "BeverageX." The user 118 may provide a voice-based selection of the interactive item (P), and a trigger to add the "BeverageX" to a personalized list.

Preferably, the overlay duration of each interactive item may be equal to the playback duration of each media item, at the user device 116. Alternatively, the overlay duration of each interactive item may be more or less than the playback duration of each media item, at the user device 116. In certain embodiments, the overlay duration for the interactive items may not be fixed and may vary in accordance with user interactions with the interactive items. In such cases, the client application engine 116A may trigger the overlay engine 208 to terminate the overlay of the interacted interactive items.

In accordance with the second operational configuration, the overlay engine 208 may be further configured to activate the overlaid interactive items at the user device 116. The activation may correspond to an activation of a specific behavior of each of the interactive items for the overlay duration, with the user selection or after the user selection of the interactive items. The behavior of each of the interactive items for the overlay duration may include a set of visual or audio, audio-visual or haptic effects on each interactive item to get the attention of the user 118 toward the overlaid interactive item, the media item, or the product or service offering. Additionally, one or more behavioral profiles for different geographical regions and demographics may be utilized to configure the behavior of each interactivity item between the playback start time and the playback end time of each media item. For example, a behavior profile of a 15 year-old teen may be used to configure the behavior of the interactive items. The behavior profiles may be utilized to implement a touch-based game that may manipulate the 15 year-old teen to interact with the media items during an engagement with the touch-based game.

Each user interaction with the interactive items may correspond to an event trigger for a specific media item and associated product or service offering. The client application engine 116A may be configured to generate the event triggers for the one or more interactions of the user 118 with the interactive items. The one or more interactions may be provided based on a selection of the interactive items over the media items. The selection of the media items may be activated based on at least one of a touch input, a gesture input, a haptic feedback input, a voice input, or a specialized circuitry for a real-time wireless selection of the media items.

As an example, the client application engine 116A may be accessed by a user on a touch-enabled device. The overlay engine 208 may generate one or more touch-sensitive transparent buttons (as interactive items) for each media item in the media content of the distribution network 104. As another example, the client application engine 116A may be accessed by a user on a gesture-enabled device. The overlay engine 208 may generate one or more gesture-sensitive animations for each media item in the media content of the distribution network 104.

The generated event triggers may be transmitted to the detection engine 210, the list server 212, and the user manager 214, via the communication network 126. The user manager 214 may record the event triggers in the user database 214A. Each event trigger may be transmitted along with an event metadata. The event metadata may comprise a trigger time, a request type, an intent score, a triggered media item, a product or service offering selection, and the like.

As an example, an event metadata (EMA) for an event triggered on an interactivity item (A) (See Example 1 and 3) may comprise a detected item identifier "ABCD0001000", a trigger identifier "TRABCD1000", a trigger time "00:36:01", a request type "Add to List", an offering Selected of "Furniture X", an intent score of "0.76", and a response time of "06 seconds."

The intent score may be a normalized score that may provide a quantifiable measure of intent or an interest of the user 118 for the displayed or promoted product or service offerings associated with the media items. The trigger time and the intent score may be utilized by a targeting engine (not shown) to target the user 118 with promotional offers or advertisements, such as discounts, sales and product or service notifications, for the interacted product or service offering. Similarly, the response time may be a time taken by the user 118 from the overlay start time to provide interaction over the overlaid interactive item. The response time may be utilized to evaluate the intent score of the user 118 for the promoted product or service offering associated with the media items.

For example, an interactive item may be interacted upon by a user for a car-based media item that may be scheduled for a playback duration of "30 seconds." An interaction may be provided by the user within the first "10 seconds" of the overlay duration. The intent score of the user 118 for the interacted interactive item may evaluate to a high score, for example, "0.67/1.0." The intent score may be utilized by the list server 212 or the targeting engine to assign preference or priority for targeting the user with the promotional content. The targeting engine may be a proprietary targeting engine or may be a third-service-provider targeting engine which may be operationally managed by at least one of affiliates, advertisers, product or service owners, brand promoters, or subscriber networks.

The detection engine 210 may be configured to receive the event triggers from the client application engine 116A for a selection of the activated interactive items, which may correspond to the media items in the media content of at least the first distribution network 104A or the second distribution network 104B. Additionally, the event metadata may be received by the detection engine 210 for each of the event triggers. The detection engine 210 may parse or filter the event metadata for each of the event triggers. The event metadata may be parsed or filtered for storage and analysis of the one or more user interactions by each of the user manager 214 and the list server 212.

An event response request may be generated by the detection engine 210 for each of the event triggers as received from the client application engine 116A. The event response request may be transmitted to the generation engine 212A of the list server 212. Additionally, the event metadata may be transmitted to the list database 212B of the list server 212. The list database 212B may be configured to store information associated with each of the received event triggers and the associated event metadata. The generation engine 212A may generate a personalized list based on the received event triggers for the overlaid interactive items. The generated personalized list may comprise at least one list item that may correspond to the media items in the media content of the distribution network 104. Each list item may specify a product offering or a service offering that may be include at least a thumbnail, a title, a set of tags, a Uniform Resource Locator (URL) and the like.

In accordance with the first operational configuration, the generation engine 212A may be configured to display the generated personalized list with the media content at the user interface of the client application engine 116A, for a defined time duration. The display of the personalized list for the defined time duration may advantageously increase an intent score of the user 118 to request the services for a specific offering that may correspond to a list item of the personalized list.

In accordance with the second operational configuration, the generation engine 212A may be configured to transmit the generated personalized list to at least one of the first distribution network 104A, the second distribution network 104B or the client application engine 116A operational on the user device 116. The personalized list may be transmitted for a display with the media content, at the user interface of the client application engine 116A, for defined time duration.

In certain embodiments, the generation engine 212A may be configured to control an overlay of the generated personalized list on the media content, at the user interface of the client application engine 116A. The overlay may be controlled for the display of the generated personalized list, at the media player that operates under control of the client application engine 116A, for the defined time duration. The controlled overlay of the generated personalized list may be facilitated by the integration of the event trigger management system 102 with the client application engine 116A on the user device 116.

The defined display start time and the display end time may be pre-evaluated to advantageously get the attention of the user 118 or affect the intent of the user 118. The display of the personalized list for the defined time duration may advantageously increase an intent score of the user 118 to request the services for a specific offering, which may correspond to the one or more list items of the personalized list. In accordance with an embodiment, the generation engine 212A may be further configured to push the generated personalized list over the one or more delivery platforms associated with the user 118. The one or more delivery platforms may include an e-mail platform, a mobile messaging platform, a webpage, a podcast, and a push notification-based platform. The generated personalized list may be communicated in a push notification over the one or more delivery platforms that may be accessible on the one or more delivery devices 120. Additionally, promotional content may be pushed to the one or more delivery devices 120 to notify the user 118 about the product or service offerings that may be selected by the user 118 while streaming the media content.

The generation engine 212A of the list server 212 may be further configured to deliver services, through the one or more delivery platforms or client application engine 116A on the user device 116, associated with the user 118. The services may be delivered based on the selection of the one or more user-selectable options in the personalized list, displayed with the media content of the distribution network 104. The services may be rendered based on an intent or interest shown by the user 118 to select products or services promoted with the media items in the media content of a distribution network 104. For example, a user (Alex) may select a product (X) and a service (Y) during broadcast of a scheduled program (Z). The product (X) and the service (Y) may be shared on a social platform to pool funds for the product (X) and the service (Y). The request to render services over the selection of the product (X) and the service (Y) may be facilitated by the event trigger management system 102.

To deliver such services, the one or more user-selectable options may be added and activated for one or more of the list items in the personalized list. Each of the one or more user-selectable options may correspond to a user-defined request to at least share, purchase, pool funds, reverse bid, add, or modify or delete the one or more list items in the generated personalized list. The one or more user-selectable options comprise an option to share on a social platform, transfer the generated list to at least one third-service-provider seller, purchase the at least one list item, provide a reverse bid for the at least one list item, and modify the at least one list item in the generated list. The services and associated stages of delivery have been described as an example in FIG. 7A-7E.

The detection engine 210 may receive user-defined requests for the selection of the one or more user-selectable options in the personalized list. The user-defined requests may be received as the event triggers at the detection engine 210. In accordance with an embodiment, a user-selectable option for a service may correspond to an option to share the one or more list items in the personalized list on a social platform that comprises a group of users. In one case, the group of users may be associated with the user 118 that selects the user-selectable option to share the one or more list items to the group of users on the social platform. In another case, the group of users may be listed in a public list (i.e. with public access) that may be published by the user 118 on the social platform.

The social media server 124 may be configured to execute tasks associated with the request to share the one or more list items in the personalized list to a group of users on the social platform. In accordance with another embodiment, a user-selectable option for a service may correspond to an option to purchase the one or more list item in the personalized list. The user manager 214 or the transaction engine may be configured to execute tasks associated with the request to purchase the one or more list items in the personalized list. The requested one or more list items may be transferred to a seller cart or directly billed for payment via defined payment engines. In accordance with yet another embodiment, a user-selectable option for a service may correspond to an option to provide a desired reverse bid for the at least one list item in the personalized list. The reverse bidding server 122 may facilitate submission of at least one reverse bid for the one or more list items.

The generation engine 212A may be further configured to generate one or more notifications based on the selection of one of the overlaid interactive items and the one or more user-selectable options in the personalized list. The one or more notifications may be notified via the client application engine 116A or the one or more delivery platforms on the one or more delivery devices 120, associated with the user 118. The generated personalized list may be updated by the generation engine 212A, in the list database 212B. For example, a user (Phil), engaged in a music listening activity via a music application on a mobile device, may hear a promotional sound clip that may recite the selected product offerings or service offering to Phil. Alternatively, Phil may receive a notification or a pop-up message on the music application or the mobile device, with the personalized list. The promotional content may comprise promotional items, which may be an advertisement for a product, service, causes, or watched programs in the media content. The promotional content may be present in one or more formats.

The one or more formats of the promotional content may be present to suitably target each of the one or more delivery platforms. Examples of the one or more formats include, but are not limited to, a video format, an audio format, a text format, an image format, or a suitable programmable or non-programmable instructions format. The promotional content may correspond to an interactive selectable item such that each selection may be recorded as part of a select stream for the corresponding user. Additionally, views or intent to select may be recorded as impressions or page redirections or commercial sale on a redirected page in real time.

It may be noted that the present disclosure has been described for an engagement of a single user with a single client application engine. However, one of ordinarily skill in the art would appreciate that the present disclosure may be applicable for a plurality of users that may engage with a plurality of client application engines, without a deviation from the scope of the disclosure. The engagement may be concurrent, sequential or at random from the plurality of users. The event trigger management system 102 may optimally balance the requirements and manage a plurality of requests from the plurality of users in real time.

Figure 3A:
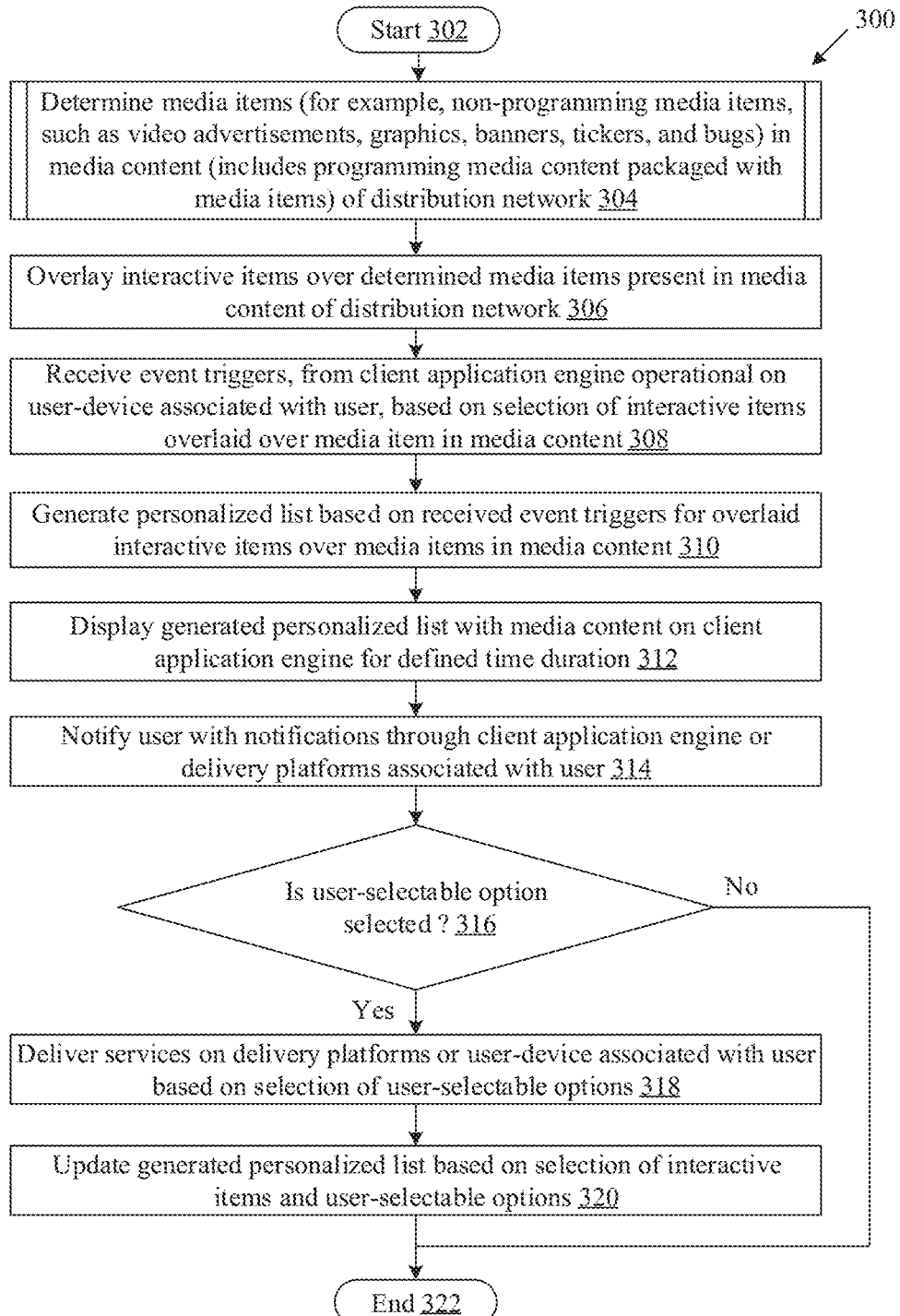
FIG. 3A is a flow chart that illustrates exemplary operations for content provider-managed delivery of OTT services through client application engines managed by the content provider, in accordance with an exemplary embodiment of the disclosure.

FIG. 3A is a flow chart that illustrates exemplary operations for content provider-managed delivery of OTT services through content provider-managed client application engines, in accordance with an exemplary embodiment of the disclosure. The exemplary operations may be performed by the exemplary event trigger management system of FIG. 2. FIG. 3A is explained in conjunction with FIG. 1A and FIG. 2. In FIG. 3A, there is shown a flow chart 300 that comprises exemplary operations from 302 through 322. The exemplary operations may start at 302 and proceed to 304.

At 304, media items may be determined within media content of a distribution network 104. The determination engine 206 may be configured to determine the media items within the media content of a distribution network 104. The determination of the media items may be analogous to a determination of a schedule and one or more attributes of each of the media items within the media content. Alternatively, the CR engine 216 may be configured to determine the media items within the media content based on a content recognition of the media content of the distribution network 104 (as discussed in FIG. 2).

At 306, interactive items may be overlaid over the determined media items in the media content of the distribution network 104. The overlay engine 208 may be configured to overlay the interactive items on the determined media items in the media content of the distribution network 104. Each interactive item may be overlaid sequentially at a determined playback time of each media item in the media content. Alternatively, each interactive item may be overlaid simultaneously on the media content (as discussed in FIG. 2).

At 308, event triggers may be received from the client application engine 116A based on the selection of the interactive items overlaid over the media items, within the media content of the distribution network 104. The detection engine 210 may be configured to receive the event triggers from the client application engine 116A. The event triggers may be received based on the selection of the interactive items overlaid over the media items (e.g., a non-programming media item) provided within the media content (e.g. a programming media item) of the distribution network 104. An event response request may be generated by the detection engine 210 for each of the event triggers received from the client application engine 116A (as discussed in detail in FIG. 2).

At 310, a personalized list may be generated for the event triggers that may correspond to the selection of the interactive items in the media content. The generation engine 212A may be configured to generate the personalized list based on the received event triggers for the overlaid interactive items over the media items in the media content. The generated personalized list may comprise one or more list items that may be associated with the media items of the media content of the distribution network 104. The personalized list may correspond to a Wish list of user-selected product or service offerings (as discussed in FIG. 2).

At 312, the generated personalized list may be displayed with the media content at the client application engine 116A, for defined time duration. The overlay engine 208 may be configured to display the generated personalized list with the media content, at the client application engine 116A, for the defined time duration. In certain embodiments, the personalized list may be packaged with the media content, or pushed over the one or more delivery platforms that may be associated with the user 118 (as discussed in FIG. 2).

At 314, one or more notifications may be notified to the user 118 through the client application engine 116A or the one or more delivery platforms associated with the user 118. The generation engine 212A may be configured to notify the user 118 with the one or more notifications, through the client application engine 116A or the one or more delivery platforms, accessible on the one or more delivery devices 120. The one or more notifications may be notified to the user 118 based on the selection of the interactive items or the one or more user-selectable options displayed with the personalized list (as discussed in FIG. 2).

At 316, it is determined whether a user-selectable option is selected by the user 118. The generation engine 212A may be configured to determine whether a user-selectable option for a list item is selected by the user 118, at the client application engine 116A or the one or more delivery platforms associated with the user 118. In an instance, when a user-selectable option in the personalized list is selected, control passes to 318. In another instance, when a user-selectable option is not selected, control passes to 320.

At 318, services may be delivered through the one or more delivery platforms or the user device 116 associated with the user, based on the selection of the user-selectable options. The generation engine 212A may be configured to deliver the services through the one or more delivery platforms or the user device 116 associated with the user, based on the selection of the user-selectable options (as described in FIGS. 2 and 7A-7E).

At 320, the generated personalized list may be updated based on the selection of the interactive items and the one or more user-selectable options. The generation engine 212A may be configured to update the generated personalized list in the list database 212B, based on the selection of the interactive items and the one or more user-selectable options. Control ends at 322.

Figure 3B:
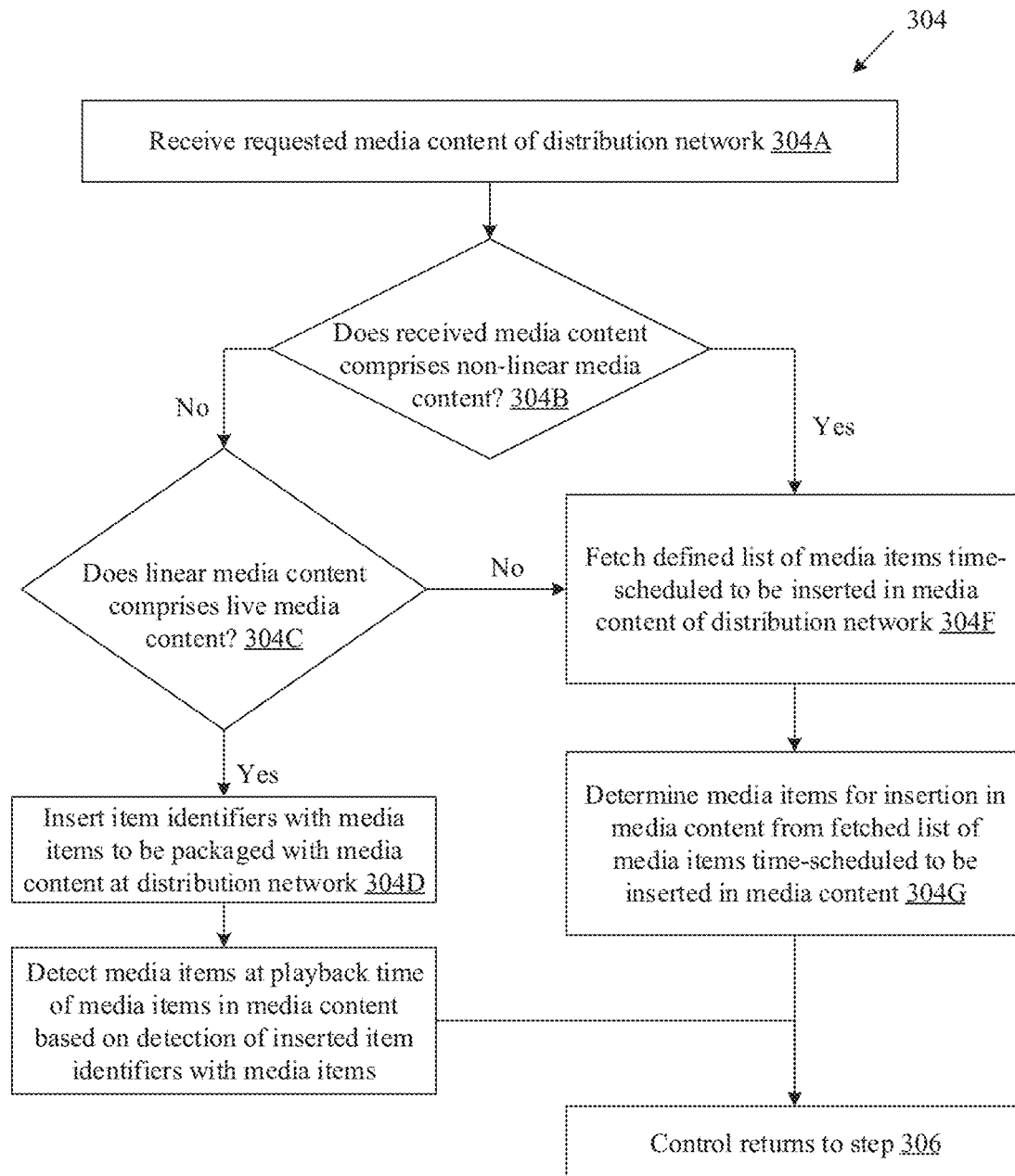
FIG. 3B is a flow chart that illustrates exemplary operations for a determination of media items, scheduled for insertion in media content of a distribution network managed by a first service provider, in accordance with an exemplary embodiment of the disclosure.

FIG. 3B is a flow chart that illustrates exemplary operations for a determination of media items, scheduled for insertion in media content of a distribution network managed by a first service provider, in accordance with an exemplary embodiment of the disclosure. The exemplary operations for the determination of media items may be executed by the exemplary event trigger management system of FIG. 2. FIG. 3B is explained in conjunction with FIGS. 1A, 1B, 2 and 3A. In FIG. 3B, there is shown a flow chart 304, that comprises sub-steps of 304 of flowchart 300, from 304A through 304G. The exemplary operations for the determination of media items may start at 304A.

At 304A, requested media content of distribution network 104 may be received. The determination engine 206 may receive the requested media content from the CDN 106 of the distribution network 104, in response to a request received from the client application engine 116A, via the communication network 126.

At 304B, it is determined whether the received media content comprises non-linear media content. The determination engine 206 may determine whether the requested media content comprises non-linear media content. In an instance, when the requested media content comprises non-linear media content, control passes to 304F. In another instance, when the requested media content doesn't comprise the non-linear media content, control passes to 304C.

At 304C, it is determined whether the linear media content comprises at least the live media content. The determination engine 206 may determine whether the linear media content comprises at least the live media content. In an instance, when the linear media content comprises at least the live media content, control passes to 304D. In another instance, when the linear media content doesn't comprise the live media content, control passes to 304F.

At 304D, item identifiers may be inserted with the media items that may be packaged with the media content. In accordance with an embodiment, the determination engine 206 or the live media server 110 may be configured to insert the item identifiers, such as an ID3 tag or an SCTE-35 message, with the media items prior to the packaging of the media items with the media content. In accordance with another embodiment, the media items server 108 may be configured to insert the item identifiers with the media items.

At 304E, the media items may be detected at a playback time of the media items in the media content based on the detection of the inserted one or more item identifiers with the media items, at a playback time of the media items. The determination engine 206 may be configured to detect the media items at a playback time of the media items in the media content, based on the detection of the inserted one or more item identifiers with the media items, at a playback time of the media items. Control returns to 306 of the flow chart 300.

At 304F, a defined list of media items, time-scheduled to be inserted in the media content, may be fetched. The determination engine 206 may be configured to fetch the defined list of media items, time scheduled to be inserted in the media content, from the schedule database 114A of the scheduler system 114. The defined list of media items may comprise the one or more attributes, such as the playback start time and the playback end time, of each of the media items (as discussed in FIG. 2).

At 304G, the media items may be determined from the fetched list of media items for insertion in the media content, from the fetched list of media items time-scheduled to be inserted in the media content. The determination engine 206 may be configured to determine the media items from the fetched list of media items for insertion in the media content, from the fetched list of media items time-scheduled to be inserted in the media content. Control returns to 306 of the flow chart 300.

Figure 4A:
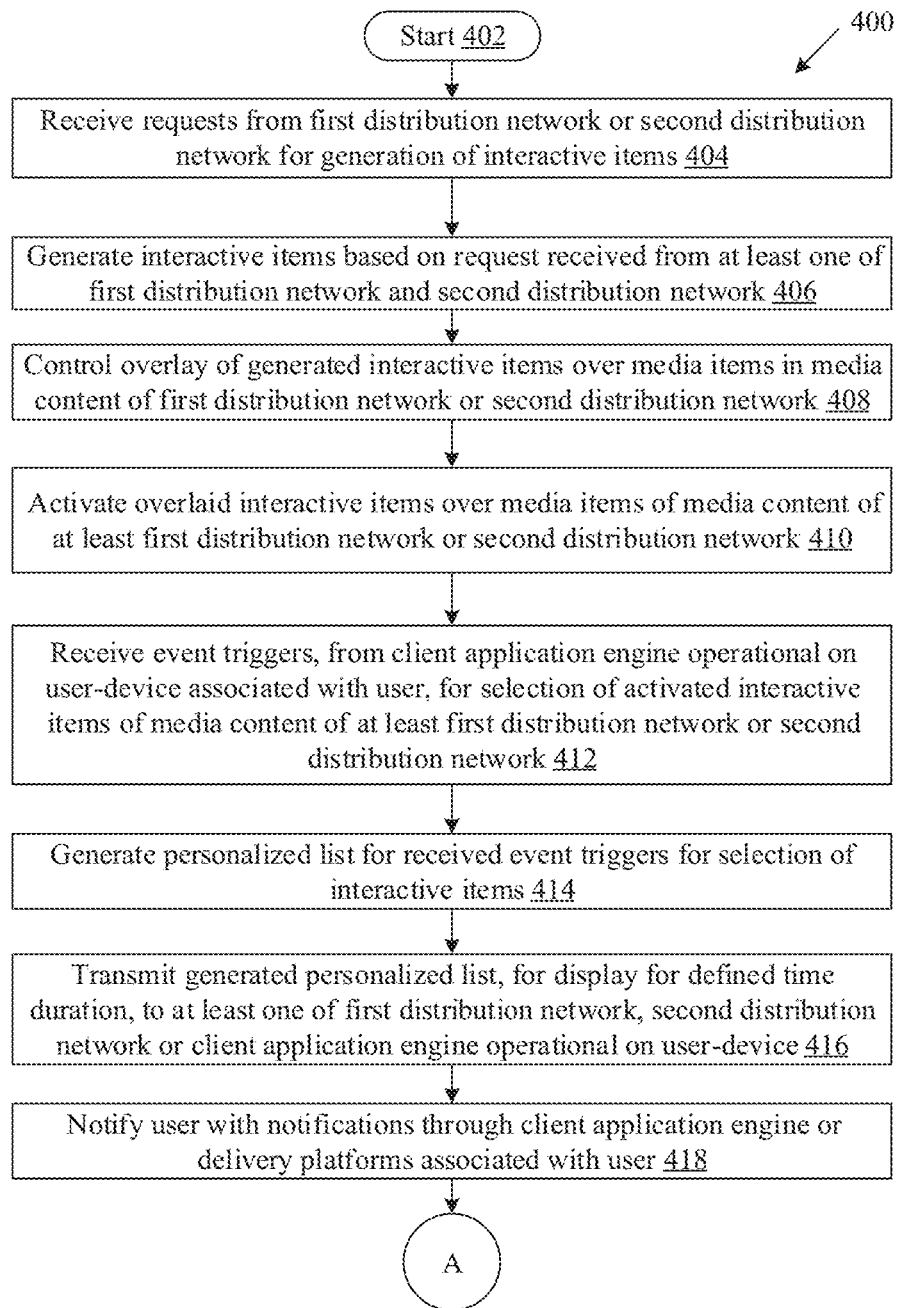
FIG. 4A and FIG. 4B is a flow chart that illustrates exemplary operations for controlled delivery of OTT services for event triggers from third-service-provider client application engines that stream media content from third-service-provider content providers, by the exemplary trigger event management system of FIG. 2, in accordance with an exemplary embodiment of the present disclosure.
Figure 4B:
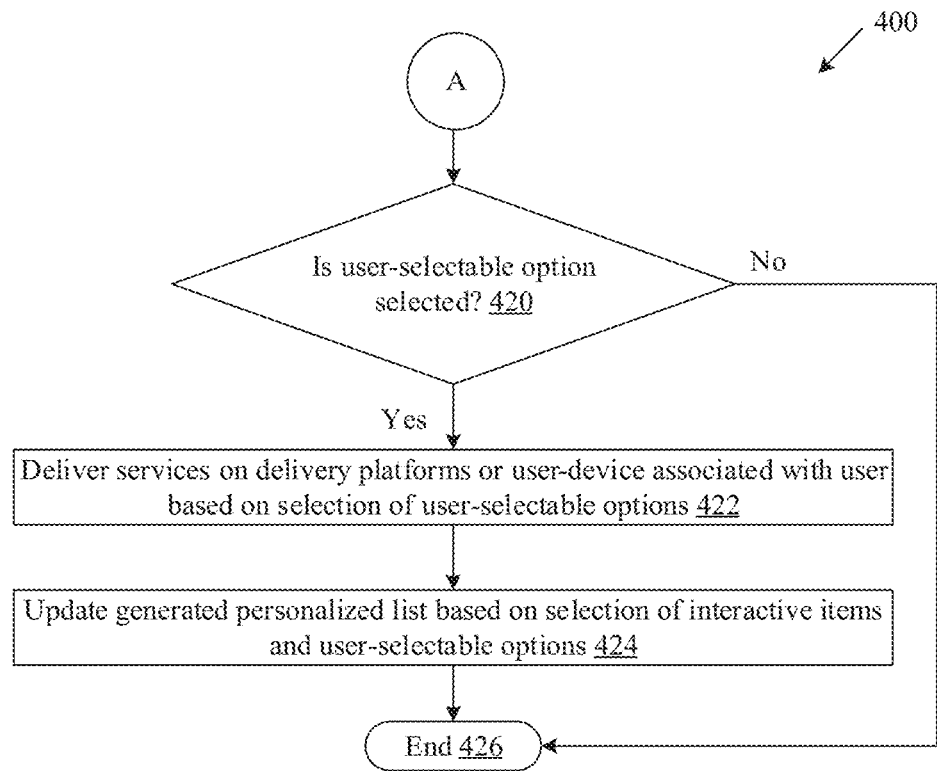

FIG. 4A and FIG. 4B is a flow chart that illustrates exemplary operations for controlled delivery of services for event triggers from third-service-provider client application engines that stream media content from third-service-provider content providers, by the exemplary trigger event management system of FIG. 2, in accordance with an exemplary embodiment of the present disclosure. The exemplary operations for the management and delivery of services may be performed by the exemplary event trigger management system of FIG. 2. FIG. 4A and FIG. 4B is explained in conjunction with FIG. 1B and FIG. 2. Referring to FIG. 4A and FIG. 4B, there is shown a flow chart 400 that comprises exemplary operations from 402 through 426. The exemplary operations for the management and delivery of services may start at 402 and proceed to 404.

At 404, a request may be received from the first distribution network 104A or the second distribution network 104B to generate the interactive items. The determination engine 206 may be configured to receive the request, via the communication network 126, from at least one of the first distribution network 104A and the second distribution network 104B, to generate the interactive items (as discussed in FIG. 2).

At 406, interactive items may be generated for the received request from at least one of the first distribution network 104A or the second distribution network 104B. The overlay engine 208 may be configured to generate the interactive items for the received request from at least one of the first distribution network 104A or the second distribution network 104B. The generated interactive items may be utilized for an overlay over the media items in the media content of at least the first distribution network 104A or the second distribution network 104B (as discussed in FIG. 2).

At 408, the overlay of the interactive items may be controlled over the media items in the media content of the first distribution network 104A or the second distribution network 104B. The overlay engine 208 may be configured to control the client application engine 116A, for an overlay of the interactive items over the media items in the media content of the first distribution network 104A or the second distribution network 104B (as discussed in FIG. 2).

At 410, the interactive items overlaid over the media items of the media content of at least the first distribution network 104A or the second distribution network 104B may be activated. The overlay engine 208 may be configured to activate the interactive items overlaid over the media items of the media content of at least the first distribution network 104A or the second distribution network 104B. The activation may correspond to an activation of a behavior of each of the interactive items for the overlay duration, for the user-selection or after the user-selection.

At step 412, event triggers may be received from the client application engine 116A operational on the user device 116 associated with the user, for the selection of the activated interactive items over the media content of at least the first distribution network 104A or the second distribution network 104B. The detection engine 210 may be configured to receive the event triggers from the client application engine 116A operational on the user device 116 associated with the user, for the selection of the activated interactive items over the media content of at least the first distribution network 104A or the second distribution network 104B. An event response request may be generated by the detection engine 210 for each of the event triggers received from the client application engine 116A (as discussed in FIG. 2).

At step 414, a personalized list may be generated for the received event triggers, for a selection of the interactive items. The generation engine 212A may be configured to generate the personalized list for the received event triggers, for a selection of the interactive items. The generated personalized list may comprise one or more list items that may correspond to the media items in the media stream of the first distribution network 104A or the second distribution network 104B (as discussed in FIG. 2).

At step 416, the generated personalized list may be transmitted for display for defined time duration, to at least one of the first distribution network 104A, the second distribution network 104B or the client application engine 116A. Additionally, the personalized list may be pushed over the one or more delivery platforms associated with the user 118. The generation engine 212A may transmit the personalized list, via the communication network 126, to the first distribution network 104A, the second distribution network 104B or the client application engine 116A (as discussed in FIG. 2).

At 418, one or more notifications may be notified to the user 118 through the client application engine 116A or the one or more delivery platforms associated with the user 118. The generation engine 212A may be configured to notify the user 118 with the one or more notifications, through the client application engine 116A or the one or more delivery platforms, accessible on the one or more delivery devices 120. The one or more notifications may be notified to the user 118 based on the selection of the interactive items or the one or more user-selectable options displayed with the personalized list (as discussed in FIG. 2).

At 420, it is determined whether a user-selectable option is selected by the user 118. The generation engine 212A may be configured to determine whether a user-selectable option for a list item is selected by the user, at the client application engine 116A or the one or more delivery platforms associated with the user 118. In an instance, when the user 118 selects a user-selectable option in the personalized list, control passes to 318. In another instance, when the user 118 does not select a user-selectable option, control passes to 320.

At 422, services may be delivered through the one or more delivery platforms or the user device 116 associated with the user, based on the selection of the user-selectable options. The generation engine 212A may be configured to deliver the services through the one or more delivery platforms or the user device 116 associated with the user, based on the selection of the user-selectable options (as described in FIGS. 2 and 7A-7E).

At 424, the generated personalized list may be updated based on the selection of the interactive items and the one or more user-selectable options. The generation engine 212A may be configured to update the generated personalized list in the list database 212B, based on the selection of the interactive items and the one or more user-selectable options. Control ends at 426.

Figure 5:
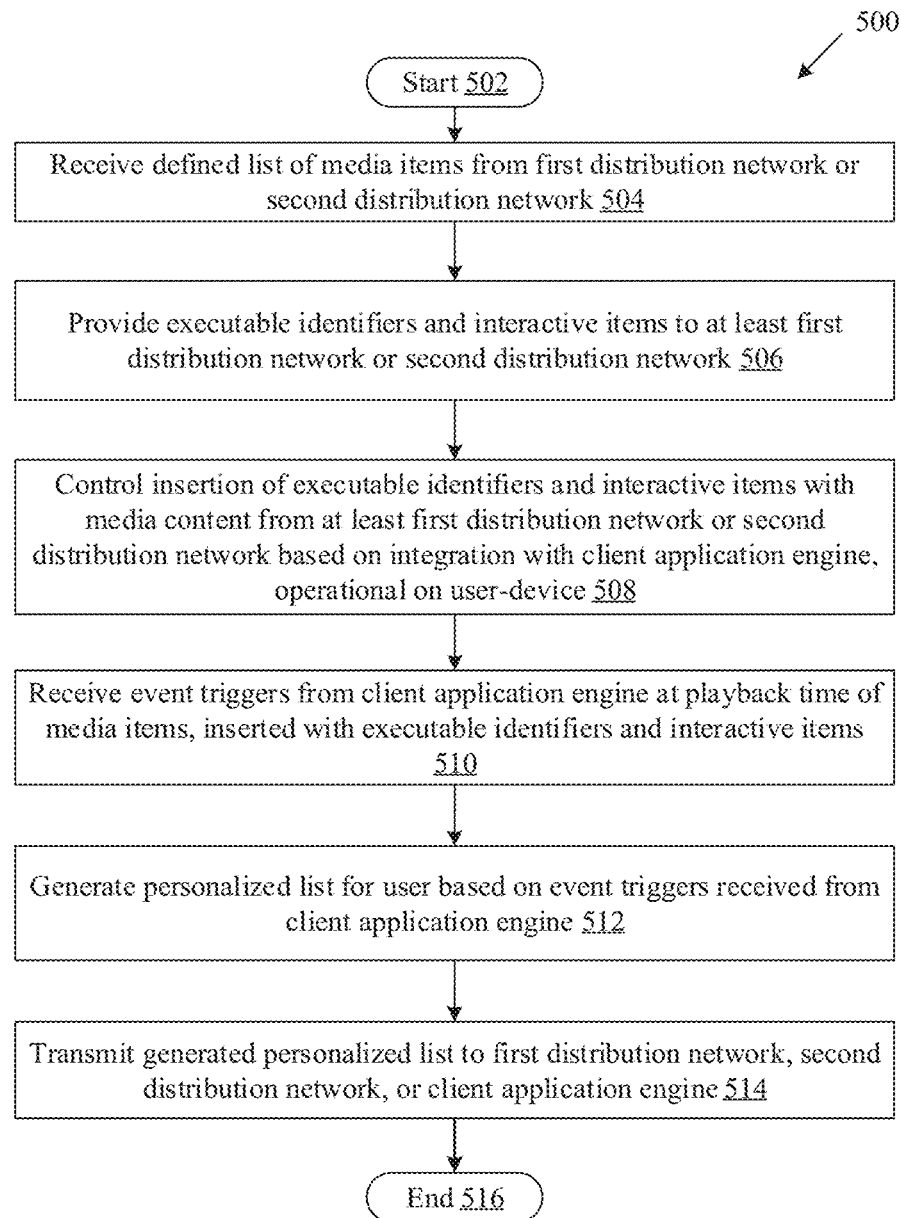
FIG. 5 is a flow chart that illustrates exemplary operations for controlled delivery of OTT services for event triggers from third-service-provider client application engines that stream media content from third-service-provider content providers on non-proprietary media networks, by the exemplary trigger event management system of FIG. 2, in accordance with an exemplary embodiment of the present disclosure.

FIG. 5 is a flow chart that illustrates exemplary operations for controlled delivery of services for event triggers from third-service-provider client application engines that stream media content from third-service-provider content providers, by the exemplary trigger event management system of FIG. 2, in accordance with an exemplary embodiment of the present disclosure. The exemplary operations for the management and delivery of services may be executed by the exemplary event trigger management system of FIG. 2. FIG. 5 is explained in conjunction with FIG. 1B, FIG. 2, FIG. 4A and FIG. 4B. In FIG. 5, there is shown a flow chart 500 that comprises exemplary operations from 502 through 516. The exemplary operations may start at 502 and proceed to 504.

At 504, a defined list of media items may be received from the first distribution network 104A or the second distribution network 104B. The determination engine 206 may be configured to receive the defined list of media items from the first distribution network 104A or the second distribution network 104B. Each media item in the defined list of media items may be associated with an item identifier, such as Ad-ID, which may be used to generate the one or more executable identifiers or the interactive items (as discussed in detail in FIG. 2).

At 506, one or more executable identifiers and interactive items may be provided to at least the first distribution network 104A or the second distribution network 104B. The overlay engine 208 may be configured to provide the one or more executable identifiers and the interactive items to at least the first distribution network 104A or the second distribution network 104B.

At 508, insertion of the one or more executable identifiers and the interactive items with the media content from at least the first distribution network 104A or the second distribution network 104B may be controlled. The overlay engine 208 may be configured to control the insertion of the one or more executable identifiers, such as the SCTE-35 messages or the ID3 tags, and the interactive items at the scheduled playback time of the media items within the media content.

At 510, event triggers may be received from the client application engine 116A at the playback time of the media items, inserted with the one or more executable identifiers and the interactive items. The detection engine 210 may be configured to receive the event triggers within the playback duration, from the client application engine 116A at the playback time of the media items, inserted with the one or more executable identifiers and the interactive items.

At 512, a personalized list may be generated for the user 118 based on the event triggers received from the client application engine 116A. The generation engine 212A may be configured to generate the personalized list for the user 118 based on the event triggers received from the client application engine 116A (as discussed in FIG. 2).

At step 514, the generated personalized list may be transmitted over to at least the first distribution network 104A, the second distribution network 104B or the client application engine 116A. Additionally, the personalized list may be pushed over the one or more delivery platforms associated with the user. The generation engine 212A may transmit the personalized list, via the communication network 126, to at least the first distribution network 104A, the second distribution network 104B or the client application engine 116A. Control ends at 516.

Figure 6:
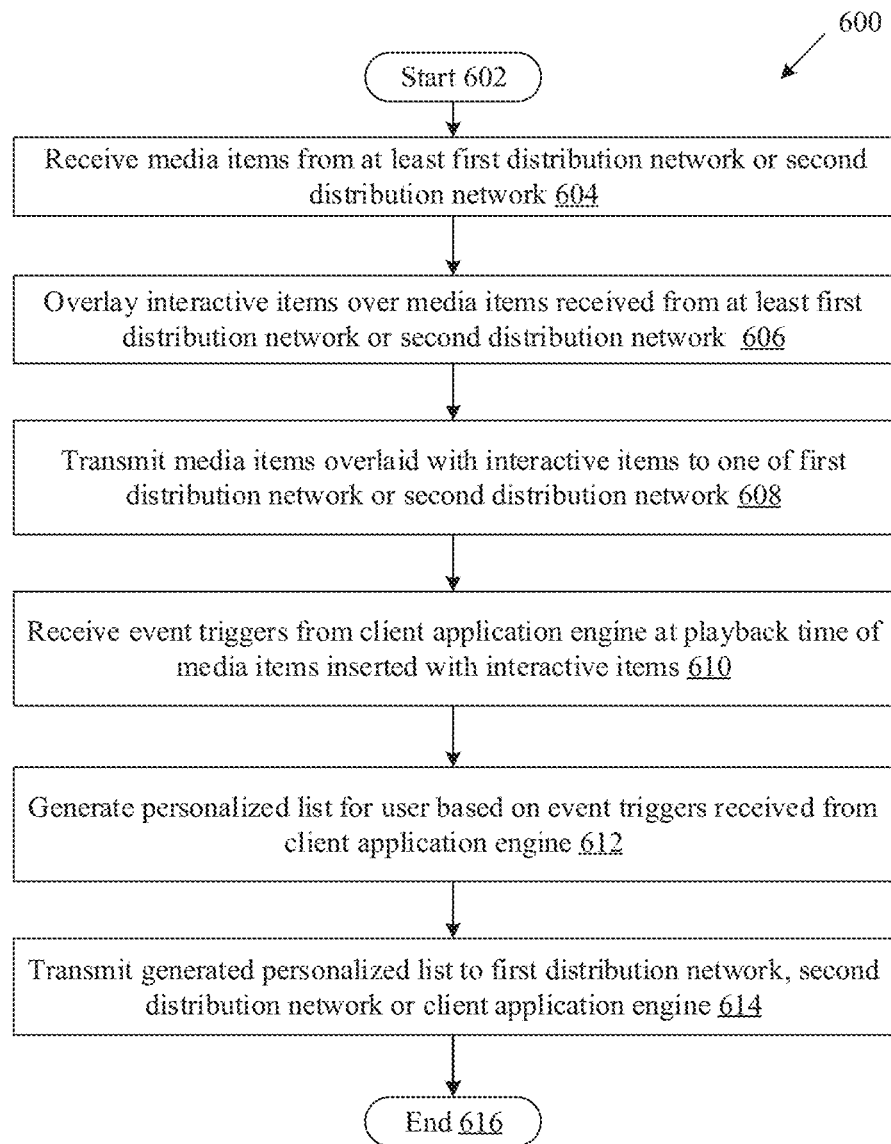
FIG. 6 is a flow chart that illustrates exemplary operations for controlled delivery of OTT services for event triggers from third-service-provider client application engines that stream media content from third-service-provider content providers, by the exemplary trigger event management system of FIG. 2, in accordance with an another exemplary embodiment of the present disclosure.

FIG. 6 is a flow chart that illustrates exemplary operations for controlled delivery of services for event triggers from third-service-provider client application engines that stream media content from third-service-provider content providers, by the exemplary trigger event management system of FIG. 2, in accordance with an exemplary embodiment of the present disclosure. The exemplary operations may be executed by the exemplary event trigger management system of FIG. 2. FIG. 6 is explained in conjunction with FIG. 1B, FIG. 2, FIG. 4A, FIG. 4B, and FIG. 5. In FIG. 6, there is shown a flow chart 600 that comprises exemplary operations from 602 through 616. The exemplary operations may start at 602 and proceed to 604.

At 604, media items may be received from at least the first distribution network 104A or the second distribution network 104B. The determination engine 206 may receive the media items from at least the first distribution network 104A or the second distribution network 104B. Additionally, in some cases, one or more attributes and playback schedule of the media items may be further received by the determination engine 206.

At 606, interactive items may be overlaid over the media items received from at least the first distribution network 104A or the second distribution network 104B. The overlay engine 208 may be configured to overlay the interactive items over the media items received from at least the first distribution network 104A or the second distribution network 104B. Each of the interactive items may be generated in accordance with the received schedule or the received one or more attributes for each of the media items.

At 608, the media items overlaid with the interactive items may be transmitted to at least the first distribution network 104A or the second distribution network 104B. The overlay engine 208 may transmit the media items overlaid with the interactive items to at least the first distribution network 104A or the second distribution network 104B, via the communication network 126.

At 610, event triggers may be received from the client application engine 116A operational on the user device 116 associated with the user, for the selection of the activated interactive items over the media content of at least the first distribution network 104A or the second distribution network 104B. The detection engine 210 may be configured to receive the event triggers from the client application engine 116A operational on the user device 116 associated with the user, for the selection of the activated interactive items over the media content of at least the first distribution network 104A or the second distribution network 104B. An event response request may be generated by the detection engine 210 for each of the event triggers received from the client application engine 116A (as discussed in FIG. 2).

At 612, a personalized list may be generated for the received event triggers, for a selection of the interactive items. The generation engine 212A may be configured to generate the personalized list for the received event triggers, for a selection of the interactive items. The generated personalized list may comprise one or more list items that may correspond to the media items in the media stream of the first distribution network 104A or the second distribution network 104B (as discussed in FIG. 2).

At 614, the generated personalized list may be transmitted for display for defined time duration, to at least one of the first distribution network 104A, the second distribution network 104B or the client application engine 116A. Additionally, the personalized list may be pushed over the one or more delivery platforms associated with the user 118. The generation engine 212A may transmit the personalized list, via the communication network 126, to the first distribution network 104A, the second distribution network 104B or the client application engine 116A. Control ends at 616.

Figure 7A:
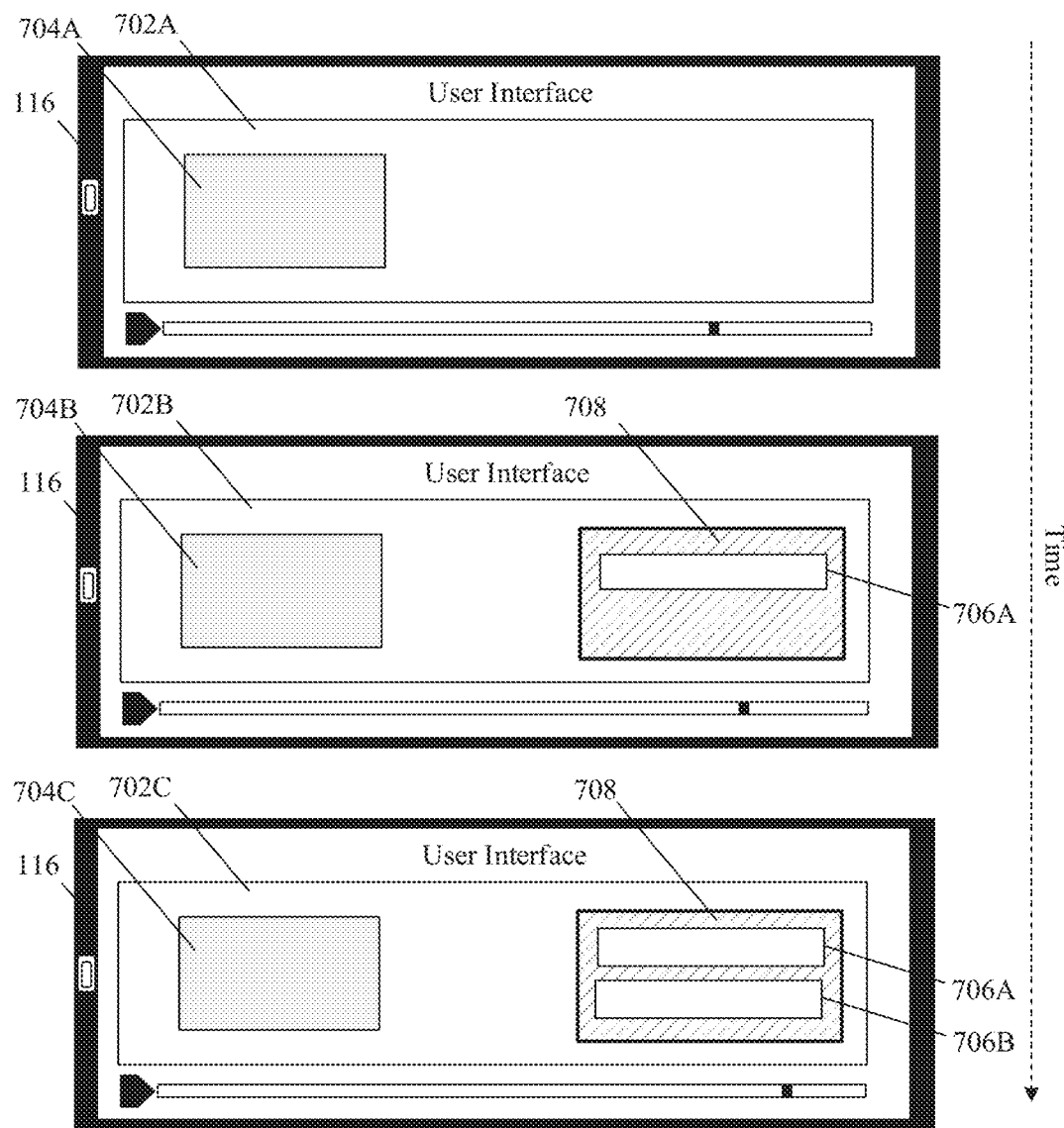
FIG. 7A is a block diagram that illustrates generation and display of a personalized list at a user interface of a user device, under control of the event trigger management system of FIG. 2, in accordance with an embodiment of the disclosure.

FIG. 7A is a block diagram that illustrates a time-lined generation and display of a personalized list, under control of the event trigger management system, at a user interface of a user device, in accordance with an embodiment of the disclosure. FIG. 7A is explained in conjunction with FIG. 1A, FIG. 1B, FIG. 2, and FIG. 3-6. The time-lined display of a personalized list 708 is merely shown as an example to illustrate selection of the interactive items for corresponding product or service offerings and generation of the personalized list 708 for the selections of the interactive items.

In FIG. 7A, there is shown a user interface at the user device 116 that displays the interactive items over streamed media items and the personalized list 708 that gets updated with product or service offerings upon selections of the displayed interactive items. The client application engine 116A at the user device 116 may be controlled based on integration (such as access and permission grants) with the event trigger management system 102.

At a first time, a media item 702A may be streamed from the CDN 106 and displayed at the user interface of the client application engine 116A. Thereafter, an interactive item 704A may be rendered as overlay interactive graphics on the media item 702A. At a second time, a media item 702B may be streamed and displayed at the user interface of client application engine 116A. At a third time, a media item 702C may be streamed from the CDN 106 and displayed at the user interface of the client application engine 116A. Interactive items 704A, 704B and 704C may be rendered on the media item 702A, 702B and 702C, respectively. A user, engaged with the media content, selects the overlaid interactive item 704A and 704B at the first time and the second time, respectively. Upon selections of the interactive item 704A and 704B, a personalized list 708 is rendered and displayed at the user interface of the client application engine 116A, which comprises at least one list item, such as a product offering 706A and a service offering 706B. The aforementioned generation, rendering and display of the media items 702A, 702B, and 702C, and subsequent overlay of the interactive items 704A, 704B and 704C and the personalized list 708 may be controlled by the event trigger management system 102. The personalized list 708 may be served to the client application engine 116A to facilitate the user 118 to request the delivery of the services associated with the selected list items in the personalized list 708, such as offering-purchases, reverse bids, sharing on social platforms, and the like.

Figure 7B:
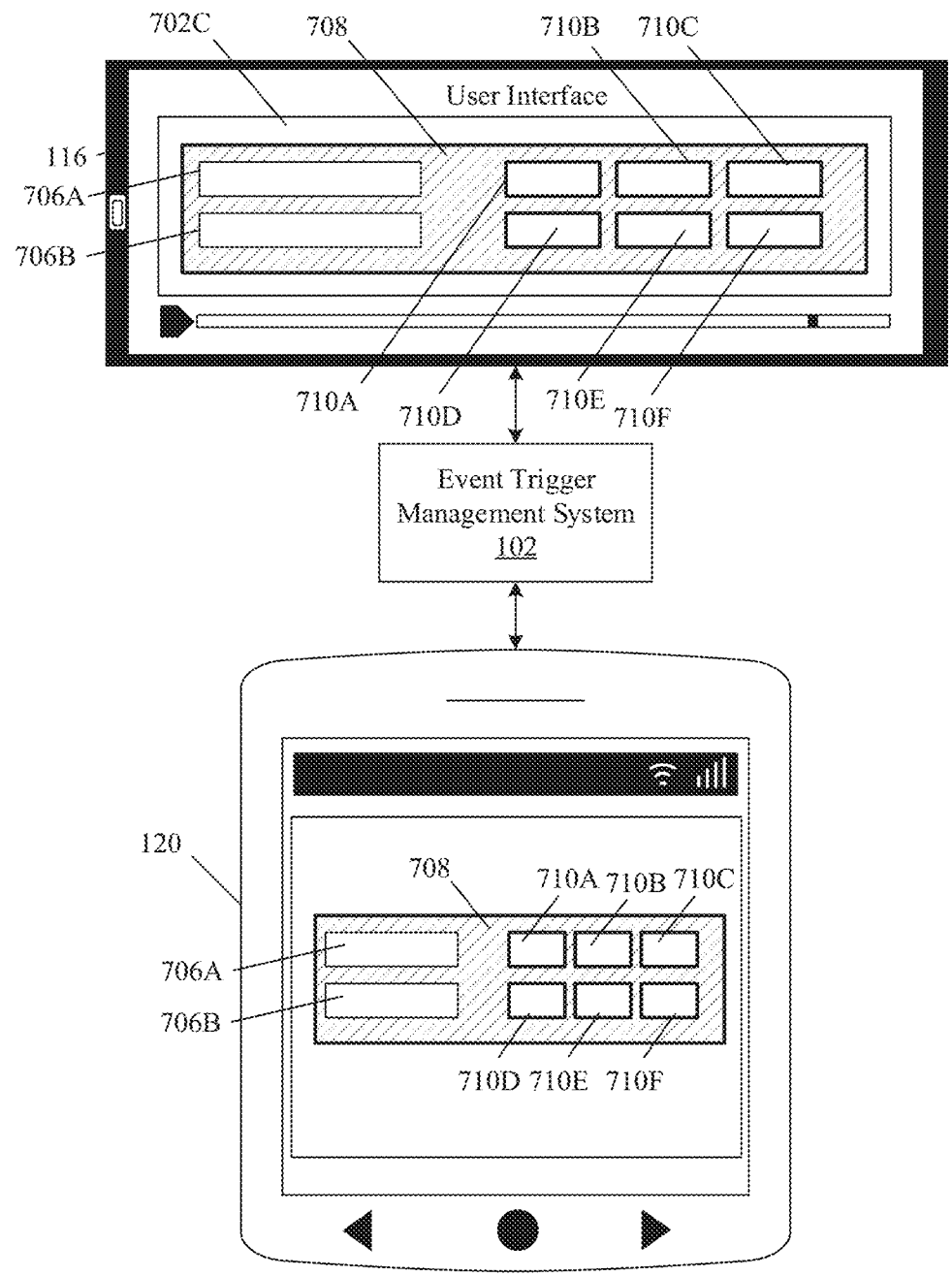
FIG. 7B is a block diagram that illustrates a user interface at a user device that facilitates display of personalized lists with user selectable options on multiple user devices, in accordance with an embodiment of the present disclosure.

FIG. 7B is a block diagram that illustrates a user interface within a client application engine that facilitates a display of generated personalized lists with user-selectable options on multiple user devices, in accordance with an embodiment of the disclosure. FIG. 7B is explained in conjunction with FIG. 1A, FIG. 1B, FIG. 2, FIG. 3-6, and FIG. 7A. The user interface of a mobile delivery device 120 and the user device 116 are merely shown as an example to illustrate the display of the personalized list on the one or more delivery platforms accessible on the mobile delivery device 120 and the user device 116.

In FIG. 7B, there is shown the user interface of the user device 116 and a delivery platform (not shown) on the mobile delivery device 120. Upon selections of the interactive item 704A (FIG. 7A) and the interactive item 704B (FIG. 7A), the personalized list 708 (FIG. 7A) that comprises the product offering 706A and the service offering 706B, may be pushed and displayed at the user interface of the user device 116 and similarly, on the delivery platform of the mobile delivery device 120. The event trigger management system 102 may control activation of one or more user-selectable options for the product offering 706A and the service offering 706B. The product offering 706A may include an option to share 710A, bid 710B, buy 710C and the service offering 706B may include an option to provide a user-defined request to share 710D, bid 710E and buy 710F. The user-selectable options may facilitate a user to request delivery of services from the event trigger management system 102.

Figure 7C:
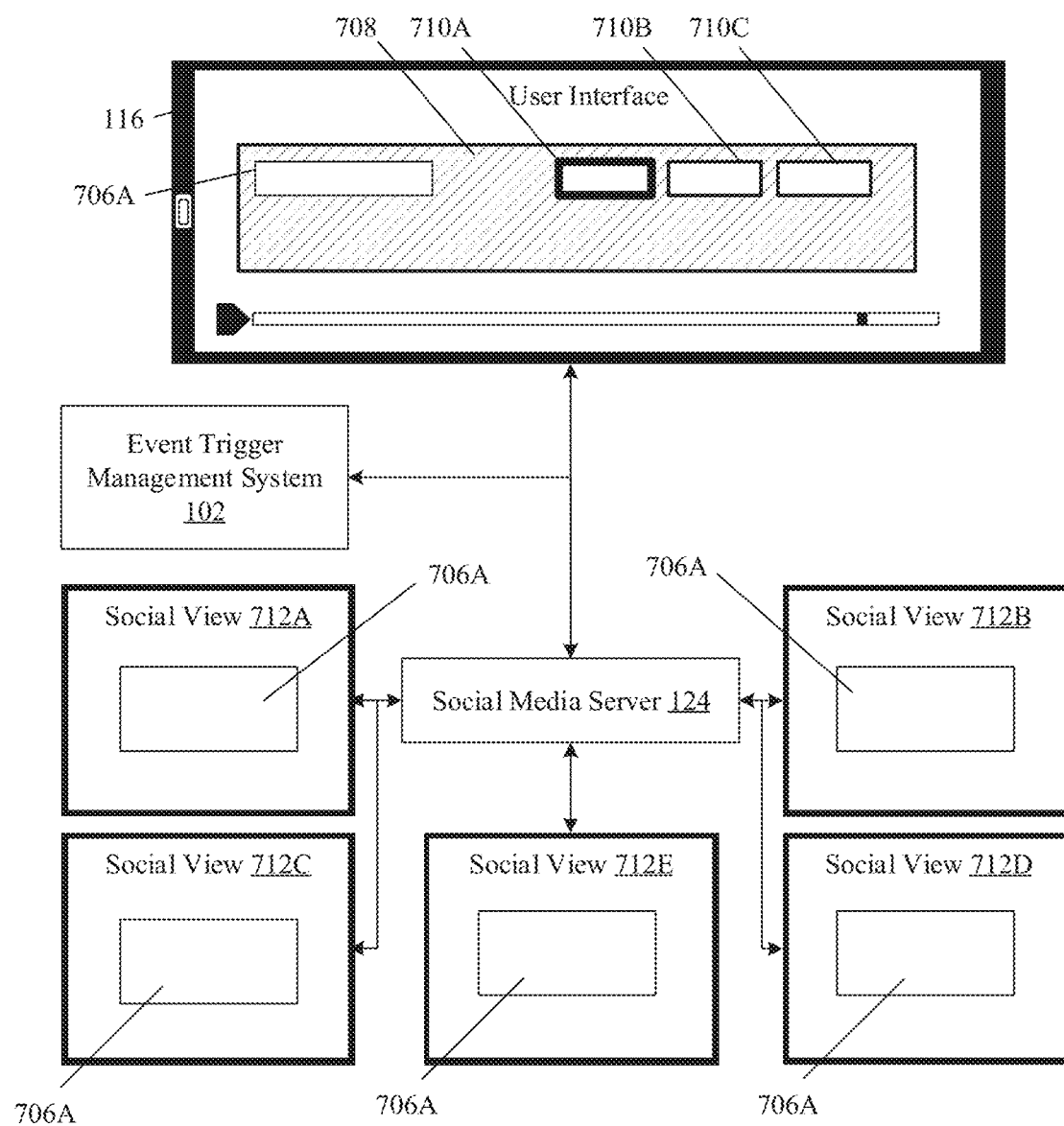
FIG. 7C is a block diagram that illustrates a user interface at a user device that facilitates sharing of personalized lists or list items on social platforms under control of the event trigger management system of FIG. 2, in accordance with an embodiment of the disclosure.

FIG. 7C is a block diagram that illustrates a user interface within a third service provider-managed client application engine that facilitates to share generated personalized lists or list items on social platforms under control of the first service provider-managed event trigger management system of FIG. 2, in accordance with an embodiment of the disclosure. FIG. 7C is explained in conjunction with FIG. 1A, FIG. 1B, FIG. 2, FIG. 3-6, FIG. 7A, and FIG. 7B. The user interface at the user device 116 and one or more social views 712A-E are merely shown as an example to illustrate social sharing service for a user. The social sharing service may be delivered upon the selection of the share 710A option on the personalized list 708 (FIG. 7A).

After the share option 710A may be selected by the user for the product offering 706A on the personalized list 708, the selection may be transmitted as a user-defined request to the event trigger management system 102 and the social media server 124. The transmitted request may be considered for delivery of the service to share the product offering 706A of the personalized list 708 to a group of users on the social platform. The social platform may be illustrated as the one or more social views 712A-E of a group of users. In one case, the group of users may be associated with the user that selects the user-selectable option to share the one or more list items to the group of users on the social platform. In another case, the group of users may be listed in a public list (i.e. with public access) that may be published by the user on the social platform. Each of social view may display at least one of graphical, audible or textual view of the shared product offering 706A. The event trigger management system 102 may control delivery of responses or feedbacks on the shared product offering 706A to the user. The responses or feedbacks may be provided by at least one user in the group of users. Additionally, the event trigger management system 102 may control pooling of funds for the shared product offering 706A as per a request to pool funds for the shared product offering 706A.

Figure 7D:
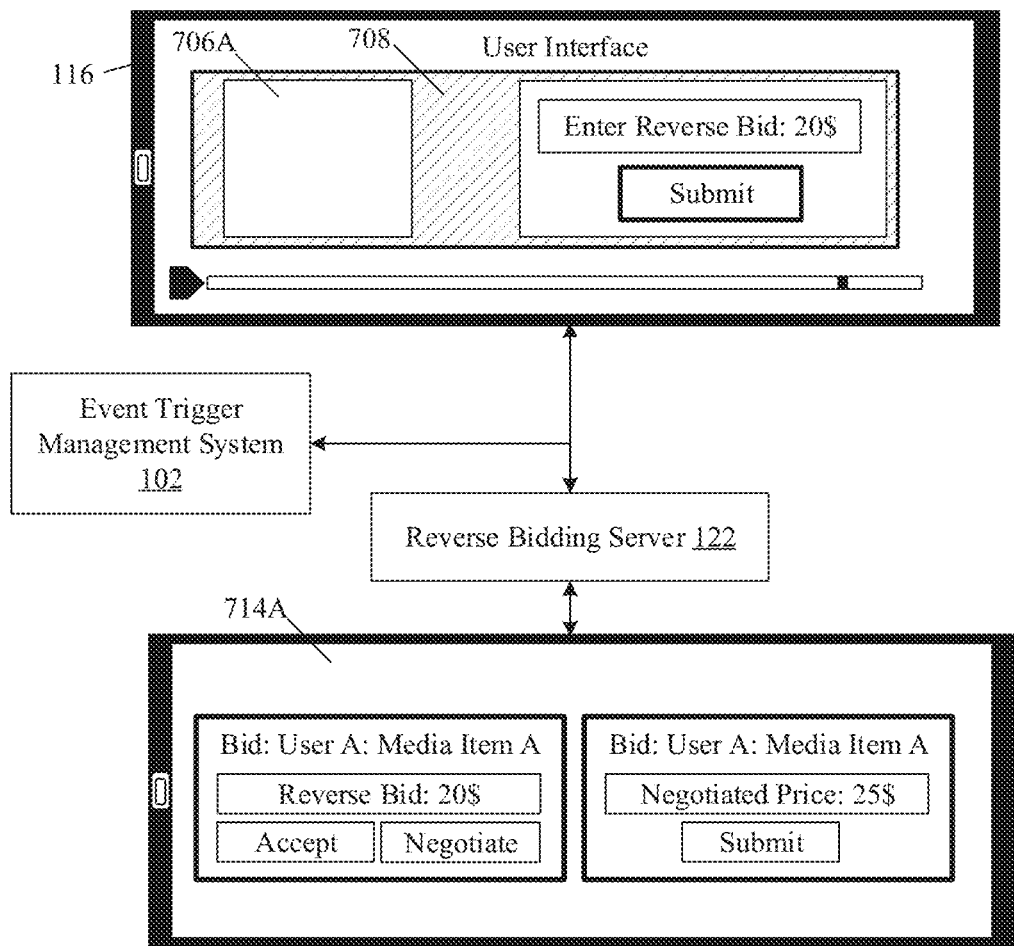
FIG. 7D is a block diagram that illustrates a user interface at a user device that provides a request to the event trigger management system of FIG. 2 to reverse bid on products or services offerings displayed in a personalized list, in accordance with an embodiment of the disclosure.

FIG. 7D is a block diagram that illustrates a user interface at a user device that provides a request to the event trigger management system of FIG. 2, to reverse bid on products or services displayed in a personalized list, in accordance with an embodiment of the disclosure. FIG. 7D is explained in conjunction with FIG. 1A, FIG. 1B, FIG. 2, FIG. 3-6, FIG. 7A, FIG. 7B, and FIG. 7C.

The user interface of the user device 116 and a seller view 714A are merely shown as an example to illustrate the control and delivery of a reverse bidding service for the user, upon the selection of the bid 710B option on the personalized list 708 (FIG. 7A). After the user selects the bid 710B option for the product offering 706A on the personalized list 708, the selection may be transmitted as a user-defined request to the event trigger management system 102 and the reverse bidding server 122. The transmitted request is considered for delivery of reverse bidding service for the selected product offering 706A in the personalized list 708.

In response to the selection of the bid 710B option, a bidding page view is displayed over a user interface of the client application engine 116A. The bidding page view provides a field that takes price and quantity (not shown) as input. The price corresponds to a reverse bid, for example, a reverse bid of "20 USD", which the user may be willing to pay for the selected product offering 706A. The bidding page view may be a part of the personalized list 708 or may be rendered as a standalone view by the client application engine 116A or associated delivery platforms on the delivery device 120 (FIG. 7B) of the user. The event trigger management system 102, in conjunction with the reverse bidding server 122, may push the reverse bid from the user for the product offering 706A, on the seller view 714A. The seller view 714A may correspond to a graphical user interface (GUI) of the seller-end client application engine 116A. The seller view 714A, upon receiving the reverse bid, may be activated with an option to accept the reverse bid for the product offering 706A. Alternatively, the seller view 714A may be activated with an option to negotiate the reverse bid or offer promotional discounts on the product offering 706A. The aforementioned communication and delivery of reverse bidding service for the user and negotiation options for the sellers is facilitated by the event trigger management system 102 in conjunction with the reverse bidding server 122.

Figure 7E:
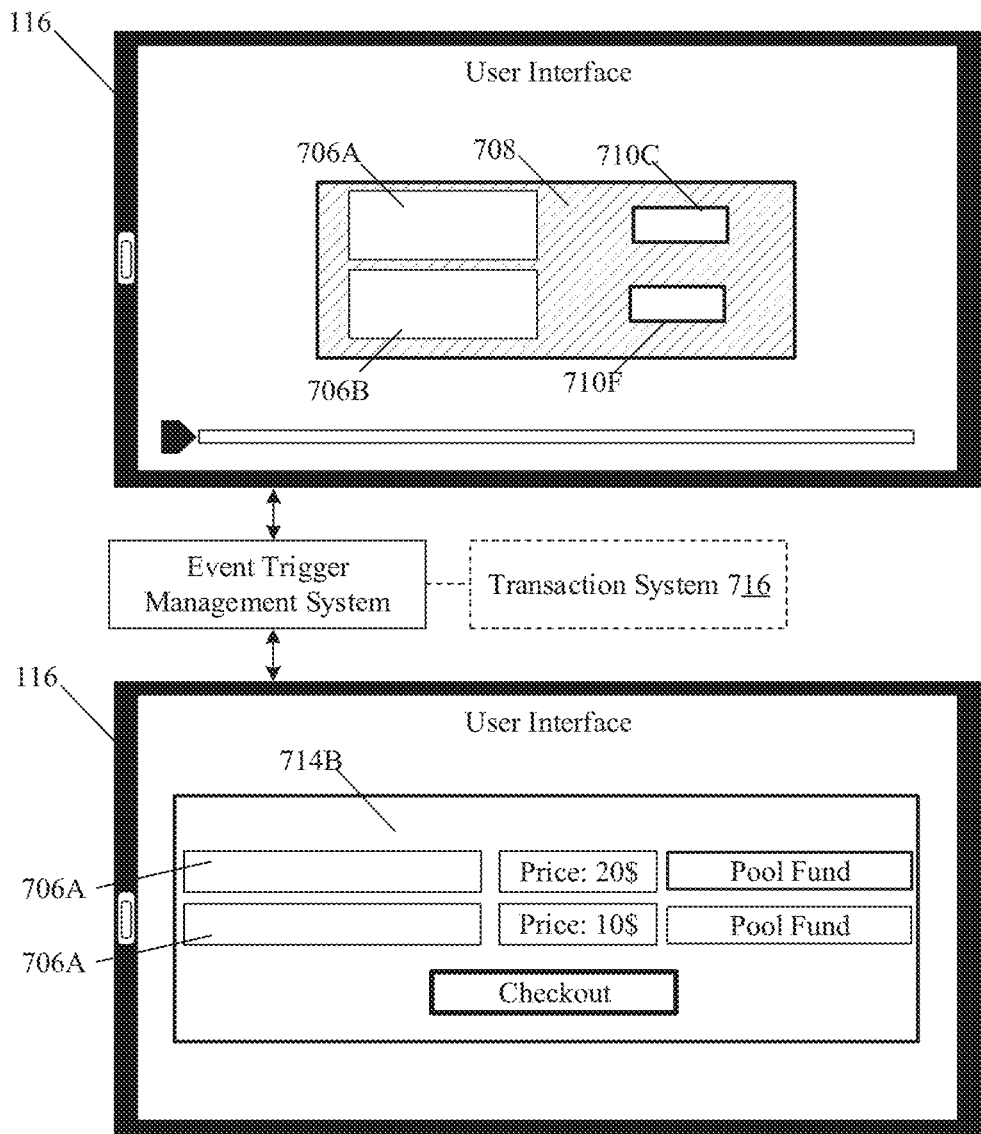
FIG. 7E is a block diagram that illustrates a user interface at a user device that provides a request to the event trigger management system of FIG. 2, to purchase products or services offerings displayed in a personalized list, in accordance with an embodiment of the disclosure.

FIG. 7E is a block diagram that illustrates a user interface at a user device that provides a request to the event trigger management system of FIG. 2, to purchase products or services displayed in a personalized list, in accordance with an embodiment of the disclosure. The user interface of the user device 116 and a seller cart 714B are merely shown as an example to illustrate the delivery of buy service for the user, upon the selection of the buy option 710C and 710F from the personalized list 708. After the user selects the buy option 710C and the buy option 710F for the product offering 706A and the service offering 706B on the personalized list 708, the selection is transmitted as a user-defined request to the event trigger management system 102 and a transaction system 716, which may be managed by the first service provider of the distribution network 104 or a third service provider transactional network. The transmitted request may be considered for delivery of a buy service for the product offering 706A and the service offering 706B in the personalized list 708. In response to the selection of the buy option 710C and the buy option 710F, the seller cart 714B may be displayed at the user interface of the user device 116. The seller cart 714B may further provide an option to pool funds for the selected product offering 706A or the service offering 706B. Additionally, an option to checkout or purchase the selected product offering 706A and the service offering 706B may be activated for the user. The seller cart 714B may displays price, such as "20 USD" and "10 USD", for the product offering 706A and the service offering 706B. The seller cart 714B may be a proprietary seller cart or an affiliate seller cart that may be associated with resellers or sellers of the product or service offerings. The event trigger management system 102, in conjunction with the transaction system 716, may facilitate the user to complete payment/transaction for the selected product offering 706A and the service offering 706B.

Figure 8:
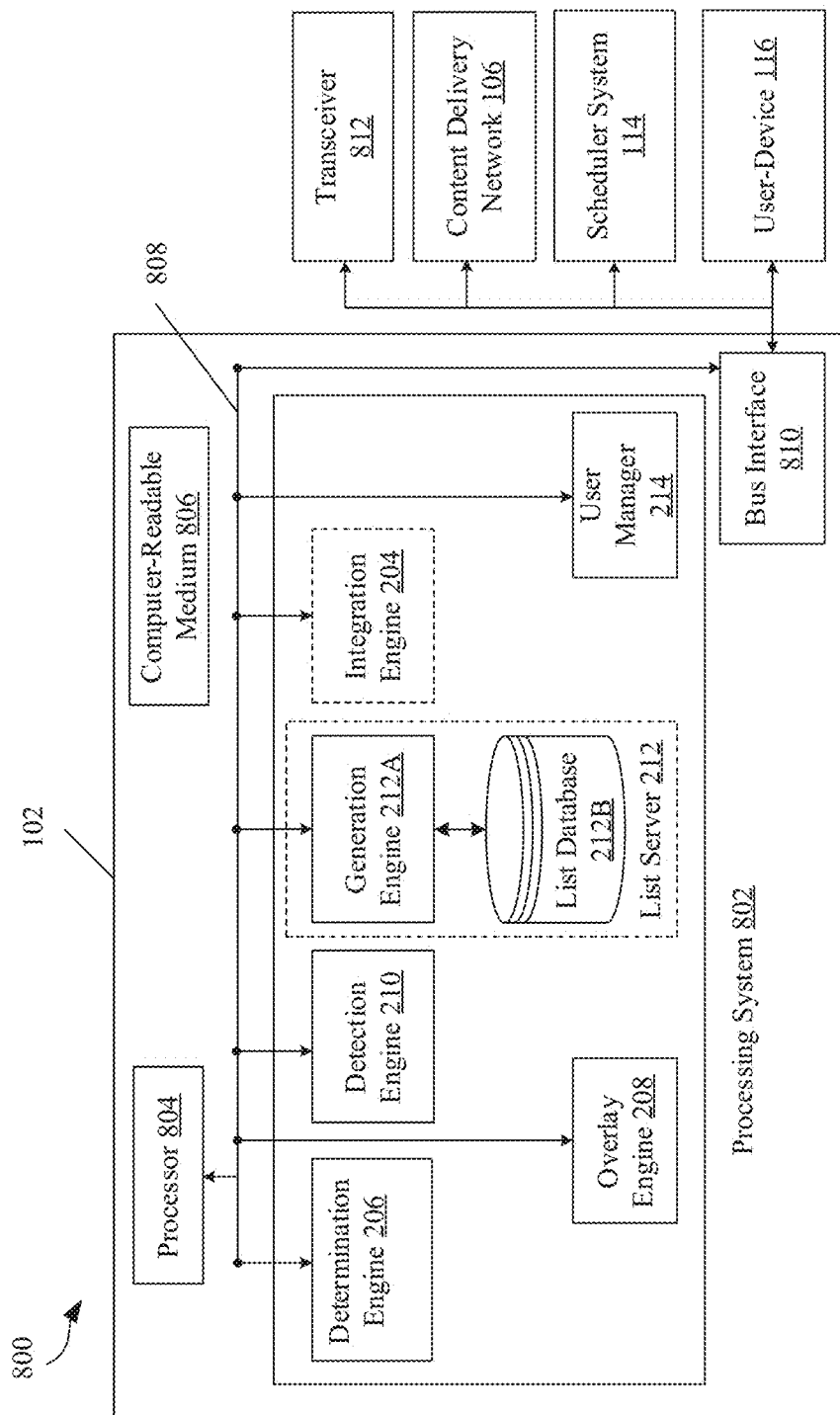
FIG. 8 is a conceptual diagram that illustrates an example of a hardware implementation for the event trigger management system of FIG. 2 that employs a processing system for delivery of OTT services on client application engines that stream media content from different content providers, in accordance with an exemplary embodiment of the disclosure.

FIG. 8 is a conceptual diagram that illustrates an example of a hardware implementation for the event trigger management system of FIG. 2 that employs a processing system for delivery of OTT services through client application engines, in accordance with an exemplary embodiment of the disclosure. In FIG. 8, the hardware implementation is shown by a representation 800 for the event trigger management system 102 that employs a processing system 802 for management and delivery of services on a distribution network 104, in response to the event triggers, in accordance with an exemplary embodiment of the disclosure, as described herein. In some examples, the processing system 802 may comprise one or more hardware processors 804, a non-transitory computer-readable medium 806, the integration engine 204, the determination engine 206, the overlay engine 208, the detection engine 210, the generation engine 212A and the list database 212B in the list server 212, the user manager 214, and the CR engine 216.

In this example, the event trigger management system 102 that employs the processing system 802 may be implemented with bus architecture, represented generally by a bus 808. The bus 808 may include any number of interconnecting buses and bridges depending on the specific implementation of the event trigger management system 102 and the overall design constraints. The bus 808 links together various circuits including the one or more processors, represented generally by the hardware processor 804, the non-transitory computer-readable media, represented generally by the computer-readable medium 806, the integration engine 204, the determination engine 206, the overlay engine 208, the detection engine 210, the generation engine 212A and the list database 212B in the list server 212, the user manager 214, and the CR engine 216 which may be configured to carry out one or more operations or methods described herein. A bus interface 810 provides an interface between the bus 808 and a transceiver 812. The transceiver 812 facilitates communication via the communication network 126 (FIG. 1A and FIG. 1B) with various other apparatus, such as the CDN 106, the scheduler system 114 and the user device 116.

The hardware processor 804 may be configured to manage the bus 808 and general processing, including the execution of a set of instructions stored on the computer-readable medium 806. The set of instructions, when executed by the hardware processor 804, causes the event trigger management system 102 to execute the various functions described herein for any particular apparatus. The computer-readable medium 806 may also be used for storing data that is manipulated by the hardware processor 804 when executing the set of instructions. The computer-readable medium 806 may also be configured to store data for one or more of the integration engine 204, the determination engine 206, the overlay engine 208, the detection engine 210, the generation engine 212A and the list database 212B in the list server 212, the user manager 214, and the CR engine 216.

In an aspect of the disclosure, the hardware processor 804, the computer-readable medium 806, or a combination of both may be configured or otherwise specially programmed to execute the operations or functionality of the integration engine 204, the determination engine 206, the overlay engine 208, the detection engine 210, the generation engine 212A and the list database 212B in the list server 212, the user manager 214, and the CR engine 216, or various other components described herein. For example, the hardware processor 804, computer-readable medium 806, or a combination of both may be configured or otherwise specially programmed to perform the operations and functionality of the integration engine 204, the determination engine 206, the overlay engine 208, the detection engine 210, the generation engine 212A and the list database 212B in the list server 212, the user manager 214, and the CR engine 216 as described with respect to FIGS. 1A, 1B, 2, 3A, 3B, 4, 5, 6, and 7A-E.

The present disclosure may provide several advantages over the traditional service delivery and management solutions, over application platforms streaming content from different distribution networks. A mediation w.r.t access and control of the client application engine 116A by the integration engine 204, facilitates the event trigger management system 102 to overlay interactivities, measure intent and adaptively align the behavior of the interactive items without direct management and ownership of the client application engine 116A or the user device 116. The availability of the schedule database 114A discourages use of content recognition (CR) on the media content, and therefore, the event trigger management system 102 may not require additional permissions or adhere to constraints imposed upon the use of the schedule database 114A. Absence of the permission requirements and constraints provide faster overlay of interactive items and simultaneous delivery of personalized list upon selections of the interactive items. The availability of the schedule database 114A facilitates lower consumption of resources, such as memory, bandwidth and processing power as compared to the consumption by the automatic content recognition of the one or more media items. The memory and bandwidth of the communication network 126 or the event trigger management system 102 are shared among a plurality of users that request access to the media content. The bandwidth or memory efficient use of the schedule database 114A facilitates the management and delivery of services to more number of concurrent service requests from more number of users.

The event trigger management system 102 may facilitate real-time rendering of personalized lists on delivery platforms and client application engine 116A, and therefore, the transient attention span of the user on a watched media item may be converted to a sustained attention span by displaying the personalized lists for a longer period of time on the client application engine 116A or on the one or more delivery platforms. The intent as well as interest of the user to request services for the selected product or service offerings increases with continuous display of the personalized list over the media content. The response time and intent score of the user with respect to the interactive items may advantageously facilitate determination of interests of the user and therefore, provide an efficient way to personalize the interests and target the user with different services. Further, the delivery of reverse bidding service while streaming the media content facilitates the user to provide a desired price for the product or service offerings and therefore, facilitates negotiation of price for desired product or service offerings in real time.

In an aspect, certain embodiments of the present disclosure may be found in a method and system for management and delivery of services on a user device that streams from a distribution network managed by a first service provider. Various embodiments of the present disclosure may provide a system that may include one or more circuit (hereinafter, "circuitry") in an event trigger management system, which handles delivery of one or more service on the user device. The circuitry may be configured to determine one or more media items present in media content of a distribution network. One or more interactive items may be further overlaid over the determined one or more media items present in the media content of the distribution network. The circuitry may be further configured to receive one or more event triggers, from a client application engine operational on the user device and associated with a user. The one or more event triggers may be received based on a selection of the one or more interactive items overlaid over the one or more media items in the media content of the distribution network. A personalized list may be further generated based on the received one or more event triggers for the overlaid one or more interactive items over the one or more media items in the media content. The generated personalized list may comprise one or more list items that correspond to the received one or more media items in the media content of the distribution network. The circuitry may be further configured to display the generated personalized list with the media content on the client application engine, for defined time duration. The display of the personalized list for the defined time duration may increase an intent score of the user to request the one or more services for a specific offering that corresponds to the one or more list items of the personalized list.

The distribution network, the client application engine and the event trigger management system are collectively owned and managed by a first service provider. In accordance with an embodiment, the circuitry may be further configured to deliver the one or more services on one or more delivery platforms or the user device associated with the user. The delivery of the one or more services may be based on a selection of one or more user-selectable options in the personalized list, displayed with the media content of the distribution network. In an implementation, a user-selectable option for a service may correspond to an option to share the one or more list items in the personalized list on a social platform that comprises a group of users. In another implementation, a user-selectable option for a service may correspond to an option to purchase the product or service offerings in the one or more list items in the personalized list. In another implementation, a user-selectable option for a service may correspond to an option to provide a reverse bid for the one or more list items in the personalized list.

In accordance with an embodiment, the determination of the one or more media items in the media content may be based on a defined list of media items time-scheduled to be inserted in the media content of the distribution network. Alternatively, the one or more media items in the media content may be determined based on content recognition of the media content.

In accordance with an embodiment, the circuitry may be further configured to identify playback time of the one or more media items in live media content of the distribution network. The one or more media items in the live media content may be determined based on the identified playback time of the one or more media items in the live media content.

The one or more event triggers may correspond to one or more interactions provided by the user for the one or more media items that may be played with the media content of the distribution network. The one or more interactions may be provided based on the selection of the one or more interactive items displayed over one or more media items. The one or more interactive items may be selected based on one of a touch input, a gesture input, a haptic feedback input, a voice input, or a specialized circuitry for real-time wireless selection of the one or more interactive items.

In certain embodiments, the one or more media items in the media content may be further associated with at least an item identifier and playback time in the media content of the distribution network. The media content may correspond to a video stream that may be provided to the client application engine via a distribution service. The media content may comprise at least one of live media content, Video-On-Demand (VOD) media content, and scheduled linear media content. The one or more media items may further include promotional content that comprises graphical content, textual content, video content and animated content.

The circuitry may be further configured to insert one or more item identifiers with the one or more media items to be packaged with the media content, at the distribution network. The one or more media item may be detected at playback time of the one or more media items in the media content based on the detection of the inserted one or more item identifiers with the one or more media items. The circuitry may be further configured to overlay the one or more interactive items for the detected the one or more media items in the media content, at the playback time of the one or more media items. Each of the one or more item identifiers may correspond to an audio-based, an image-based beacon, or a data-based beacon that may be inserted or encoded with the media items to be packaged with the media content. Such item identifier may be derived from the media items.

In accordance with an embodiment, the circuitry may be further configured to display the generated personalized list on one or more delivery platform associated with the user. In accordance with an embodiment, the circuitry may be further configured to update the generated personalized list based on the selection of the one or more interactive items and one or more user-selectable options.

The circuitry may be further configured to notify the user with one or more notifications through the client application engine or one or more delivery platform associated with the user. The one or more notifications may be notified to the user based on the selection of the one or more interactive items and the one or more user-selectable option displayed with the personalized list.

In another aspect, certain embodiments of the present disclosure may be found in a method and system for management and delivery of services, by a first service provider, on a user device that streams from a first distribution network or a second distribution network, managed by a second service provider or a third service provider, respectively. Various embodiments of the present disclosure may provide a system that may include one or more circuit (hereinafter, "circuitry") in an event trigger management system, which handles delivery of one or more service on the user device. The circuitry may be configured to generate one or more interactive items based on a request received from at least one of a first distribution network and a second distribution network. The one or more interactive item may be overlaid over the one or more media items present in media content of at least the first distribution network or the second distribution network. The circuitry may be further configured to activate the overlaid one or more interactive items overlaid over the one or more media items of at least the first distribution network or the second distribution network. The circuitry may be further configured to receive one or more event triggers, from a client application engine operational on the user device and associated with a user. The one or more event triggers may be received based on a selection of the enabled one or more interactive items that may correspond to the one or more media items of at least the first distribution network or the second distribution network. A personalized list for the received one or more event trigger based on the selection of the one or more interactive items. The generated personalized list may comprise one or more list items that correspond to product or service offerings promoted with the one or more media items in the media content of at least the first distribution network or the second distribution network. The circuitry may be further configured to transmit the generated personalized list, for display for defined time duration, to at least one of the first distribution network, the second distribution network or the client application engine operational on the user device. The display of the personalized list for the defined time duration may increase an intent score of the user to request the one or more services for a specific offering that may correspond to the one or more list items of the personalized list.

The event trigger management system may be owned and managed by a first service provider, the first distribution network and the client application engine are owned and managed by a second service provider, and the second distribution network is owned and managed by a third service provider, and wherein the first service provider is different from the second service provider and the third service provider. In accordance with an embodiment, the first distribution network may be a programming media network and the second distribution network may be a non-programming media network.

The received one or more event triggers may be associated with one or more item identifiers for the one or more media items of the media content of at least the first distribution network or the second distribution network. The one or more item identifiers may comprise an audio-based, an image-based beacon, or a data-based beacon that may be inserted or encoded with the media content. Such identified may be derived based on the media items. The one or more event triggers may be associated with a device address for the client application engine or the user device that generated the one or more event triggers. The one or more interactive items may correspond to one or more interactive options to be graphically overlaid over the one or more media items of the media content.

In accordance with an embodiment, the circuitry may be further configured to determine one or more attributes of the one or more media items in the media content based on the received request from at least the first distribution network or the second distribution network. The one or more attributes may comprise at least one of a set of digital video fingerprints and a set of digital audio fingerprints. Alternatively, the one or more attributes of the one or more media items in the media content may be determined based on content recognition of the one or more media items in the media content of at least the first distribution network or the second distribution network.

In accordance with an embodiment, the circuitry may be further configured to provide one or more executable identifiers and the one or more interactive items for the one or more media items of the media content, which may be received from at least the first distribution network or the second distribution network. The circuitry may be further configured to control insertion of the one or more executable identifiers and the one or more interactive items with the media content from at least the first distribution network or the second distribution network. The controlled insertion of the one or more executable identifiers may be based on integration with the client application engine, operational on the user device. The circuitry may be further configured to receive the one or more event triggers from the client application engine at playback time of the one or more media items, which may be further enabled with the one or more executable identifiers and the one or more interactive items. The personalized list may be further generated for the user based on the received one or more event triggers from the client application engine and the generated personalized list may be transmitted to the client application engine.

In accordance with an embodiment, the circuitry may be further configured to receive the one or more media items from at least the first distribution network or the second distribution network. The one or more interactive items may be inserted over the received one or more media items received from at least the first distribution network or the second distribution network. The circuitry may be further configured to transmit the one or more media items inserted with the one or more interactive item, to one of the first distribution network or the second distribution network. In response, the circuitry may be further configured to receive the one or more event triggers from the client application engine, at playback time of the one or more media item inserted with the one or more interactive items. The personalized list for the user may be further generated based on the one or more event triggers received from the client application engine and the generated personalized list may be transmitted to the client application engine.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or." As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, one of those skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences, and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps, and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
    at least one circuit in an event trigger management system for delivery of at least one service on a user device associated with a user, wherein the at least one circuit is configured to:
        determine at least one media item in media content of a distribution network;
        overlay at least one interactive item over the determined at least one media item in the media content of the distribution network;
        receive at least one event trigger, from a client application engine operational on the user device, based on a selection of the at least one interactive item overlaid over the at least one media item in the media content of the distribution network;
        generate a personalized list based on the received at least event trigger for the at least one interactive item over the at least one media item in the media content,
        wherein the generated personalized list comprises at least one user-selectable option to deliver a reverse bidding service to a seller of the at least one service and at least one list item corresponding to the at least one media item in the media content,
        wherein the reverse bidding service is delivered to the seller while the media content is streamed on the client application engine;
        select the at least one user-selectable option in the generated personalized list with the media content on the client application engine for a defined time duration;
        determine a measure of an intent score of the user based on a plurality of list items indicating at least one of a product or a service that is overlaid over the media content for the defined time duration and the selection of the at least one user-selectable option in the generated personalized list with the media content within the defined time duration,
        wherein the intent score of the user is associated with a request of the at least one service for a specific offering that corresponds to the at least one list item of the personalized list; and
        deliver the at least one service on at least one delivery platform or the user device based on the intent score.

2. The system according to claim 1, wherein the at least one circuit is further configured to deliver the at least one service on the at least one delivery platform or the user device associated with the user based on the selection of the at least one user-selectable option in the personalized list, displayed with the media content of the distribution network.

3. The system according to claim 2, wherein the at least one user-selectable option for the at least one service corresponds to an option to share the at least one list item in the personalized list on a social platform that comprises a group of users.

4. The system according to claim 2, wherein the at least one user-selectable option for the at least one service corresponds to an option to purchase the at least one list item in the personalized list.

5. The system according to claim 2, wherein the at least one user-selectable option for the at least one service corresponds to an option to provide a reverse bid for the at least one list item in the personalized list.

6. The system according to claim 1, wherein the determination of the at least one media item in the media content is based on a list of media items, wherein the list of media items are time-scheduled for insertion in the media content of the distribution network.

7. The system according to claim 1, wherein the at least one media item in the media content is determined based on content recognition of the media content.

8. The system according to claim 1, wherein the at least one circuit is further configured to identify a playback time of the at least one media item in a live media content of the distribution network, and wherein the at least one media item in the live media content is determined based on the identified playback time of the at least one media item in the live media content.

9. The system according to claim 1, wherein the at least one event trigger corresponds to at least one interaction provided by the user for the at least one media item that is played with the media content of the distribution network, and wherein the at least one interaction is provided based on the selection of the at least interactive item displayed over at least one media item.

10. The system according to claim 1, wherein the at least one interactive item is selected based on at least one of a touch input, a gesture input, a haptic feedback-input, a voice input, or a specialized circuitry for real-time wireless selection of at least one interactive item.

11. The system according to claim 1, wherein the at least one media item in the media content is associated with at least an item identifier and a playback time in the media content of the distribution network.

12. The system according to claim 1, wherein the media content corresponds to a video stream that is provided to the client application engine via a distribution service, and wherein the media content comprises at least one of live media content, Video-On-Demand (VOD) media content, or scheduled linear media content.

13. The system according to claim 1, wherein the at least one media item corresponds to promotional content that comprises graphical content, textual content, video content and animated content.

14. The system according to claim 1, wherein the at least one circuit is further configured to update the generated personalized list based on the selection of the at least one interactive item or the at least one user-selectable option.

15. The system according to claim 1, wherein the at least one circuit is further configured to:
insert an item identifier with the at least one media item to be packaged in the media content, at the distribution network;
detect the at least one media item at a playback time of the at least one media item in the media content based on the inserted item identifier with the at least one media item; and
overlay the at least one interactive item for the detected the at least one media item in the media content, at the playback time of the at least one media item.

16. The system according to claim 15, wherein the item identifier corresponds to an audio-based, image-based beacon, or a data-based beacon that is inserted or encoded with the at least one media item to be packaged with the media content.

17. The system according to claim 15, wherein the item identifier corresponds to an audio-based, image-based beacon, or a data-based beacon that is derived from the at least one media item.

18. The system according to claim 1, wherein the at least one circuit is further configured to display the generated personalized list on at least one delivery platform associated with the user.

19. The system according to claim 1, wherein the at least one circuit is further configured to notify the user with at least one notification through the client application engine or the at least one delivery platform associated with the user, wherein the at least one notification is notified to the user based on the selection of the at least one interactive item overlaid over the media content or the at least one user-selectable option displayed with the personalized list.

20. The system according to claim 1, wherein the distribution network, the client application engine, and the event trigger management system are collectively owned and managed by a common service provider.

21. A method, comprising:
in an event trigger management system that handles delivery of at least one service on a user device associated with a user:
determining, by at least one circuit, at least one media item in media content of a distribution network;
overlaying, by the at least one circuit, at least one interactive item over the determined at least one media item in the media content of the distribution network;
receiving, by the at least one circuit, at least one event trigger, from a client application engine operational on the user device, based on a selection of the at least one interactive item overlaid over the at least one media item in the media content of the distribution network;
generating, by the at least one circuit, a personalized list based on the received at least event trigger for the at least one interactive item over the at least one media item in the media content,
wherein the generated personalized list comprises at least one user-selectable option to deliver a reverse bidding service to a seller of the at least one service and at least one list item corresponding to the at least one media item in the media content,
wherein the reverse bidding service is delivered to the seller while the media content is streamed on the client application engine; and
selecting, by the at least one circuit, the at least one user-selectable option in the generated personalized list with the media content on the client application engine for a defined time duration;
determining a measure of an intent score of the user based on a plurality of list items indicating at least one of a product or a service that is overlaid over the media content for the defined time duration and the selection of the at least one user-selectable option in the generated personalized list with the media content within the defined time duration,
wherein the intent score of the user is associated with a request of the at least one service for a specific offering that corresponds to the at least one list item of the personalized list; and
delivering the at least one service on at least one delivery platform or the user device based on the intent score.

22. A non-transitory computer-readable medium having stored thereon, computer implemented instruction that when executed by a processor, causes the processor to execute operations, comprising:
in an event trigger management system that handles delivery of at least one service on a user device associated with a user:
determining at least one media item in media content of a distribution network;
overlaying at least one interactive item over the determined at least one media item in the media content of the distribution network;
receiving at least one event trigger, from a client application engine operational on the user device, based on a selection of the at least one interactive item overlaid over the at least one media item in the media content of the distribution network;
generating a personalized list based on the received at least event trigger for the at least one interactive item over the at least one media item in the media content,
wherein the generated personalized list comprises at least one user-selectable option to deliver a reverse bidding service to a seller of the at least one service and at least one list item corresponding to the at least one media item in the media content, wherein the reverse bidding service is delivered to the seller while the media content is streamed on the client application engine; and selecting the at least one user-selectable option in the generated personalized list with the media content on the client application engine for a defined time duration;

determining a measure of an intent score of the user based on a plurality of list items indicating at least one of a product or a service that is overlaid over the media content for the defined time duration and the selection of the at least one user-selectable option in the generated personalized list with the media content within the defined time duration, wherein the intent score of the user is associated with a request of the at least one service for a specific offering that corresponds to the at least one list item of the personalized list; and delivering the at least one service on at least one delivery platform or the user device based on the intent score.

23. The system according to claim 1, wherein the at least one circuit is further configured to increase the measure of an intent score of the user based on the display of the generated personalized list with the media content for the time duration.

24. The system according to claim 1, wherein the at least one circuit is further configured to activate the at least one user-selectable option of the personalized list based on at least one of user preferences of the user, past activities of the user, applicable options for a specific list item, demographic factors, or inventory availability.

* * * * *